United States Patent
Bischoff et al.

(10) Patent No.: US 11,433,908 B1
(45) Date of Patent: Sep. 6, 2022

(54) UTILIZING VEHICLE TELEMATICS TO DETECT, EVALUATE, AND RESPOND TO DRIVING BEHAVIORS

(71) Applicant: Allstate Insurance Company, Northbrook, IL (US)

(72) Inventors: Christine L. Bischoff, La Grange, IL (US); David Maday, Buffalo Grove, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 17/201,727

(22) Filed: Mar. 15, 2021

Related U.S. Application Data

(63) Continuation of application No. 16/452,181, filed on Jun. 25, 2019, now Pat. No. 10,946,862.

(51) Int. Cl.
 *B60W 40/09* (2012.01)
 *G06Q 40/08* (2012.01)
 *G06Q 30/06* (2012.01)
 *G07C 5/00* (2006.01)

(52) U.S. Cl.
 CPC ........ *B60W 40/09* (2013.01); *G06Q 30/0645* (2013.01); *G06Q 40/08* (2013.01); *G07C 5/008* (2013.01)

(58) Field of Classification Search
 None
 See application file for complete search history.

(56) References Cited

U.S. PATENT DOCUMENTS

| | | | |
|---|---|---|---|
| 8,090,598 B2 | 1/2012 | Bauer et al. | |
| 8,280,752 B1 | 10/2012 | Cripe et al. | |
| 8,606,512 B1 | 12/2013 | Bogovich et al. | |
| 8,731,974 B2 | 5/2014 | Pandhi et al. | |
| 9,454,786 B1 * | 9/2016 | Srey | G06Q 30/0283 |
| 9,569,798 B2 * | 2/2017 | Biemer | G06Q 40/08 |
| 9,727,920 B1 | 8/2017 | Healy et al. | |
| 9,851,214 B1 | 12/2017 | Chintakindi | |

(Continued)

FOREIGN PATENT DOCUMENTS

EP 3251075 A1 12/2017

OTHER PUBLICATIONS

Aug. 12, 2020—U.S. Non-Final Office Action—U.S. Appl. No. 16/452,181.

(Continued)

*Primary Examiner* — John F Mortell
(74) *Attorney, Agent, or Firm* — Polsinelli PC

(57) ABSTRACT

Aspects of the present disclosure relate to using vehicle telematics to detect, evaluate, and respond to driving behaviors observed during a trip in a vehicle. The vehicle telematics information may characterize the observed driving behaviors, the segments traveled in the vehicle, and type of use of the vehicle. A rate to charge a driver may be based on the observed driving behaviors and a range of rates associated with the driver. The rate may fluctuate across a series of observation periods based on the driving behaviors observed during those observation periods. The rate may be presented to the driver in real-time while the driver operates a vehicle during a trip. The rate to charge the driver may further be based on use of the vehicle for personal use, ride shares, or vehicle shares.

20 Claims, 12 Drawing Sheets

(56) References Cited

U.S. PATENT DOCUMENTS

| | | | |
|---|---|---|---|
| 9,995,584 B1 * | 6/2018 | Kanevsky | G01C 21/14 |
| 10,733,672 B1 * | 8/2020 | Bernstein | G01C 21/3438 |
| 2007/0299700 A1 | 12/2007 | Gay et al. | |
| 2010/0131303 A1 | 5/2010 | Collopy et al. | |
| 2012/0010906 A1 * | 1/2012 | Foladare | G06Q 40/08 |
| | | | 705/4 |
| 2013/0046562 A1 | 2/2013 | Taylor et al. | |
| 2013/0226622 A1 | 8/2013 | Adamson et al. | |
| 2014/0180723 A1 | 6/2014 | Cote et al. | |
| 2015/0226563 A1 | 8/2015 | Cox et al. | |
| 2015/0242953 A1 * | 8/2015 | Suiter | G07C 5/008 |
| | | | 705/4 |
| 2017/0140293 A1 | 5/2017 | Vij et al. | |
| 2017/0234689 A1 | 8/2017 | Gibson et al. | |
| 2017/0241791 A1 | 8/2017 | Madigan et al. | |
| 2018/0218452 A1 * | 8/2018 | Guensler | G06Q 40/08 |

OTHER PUBLICATIONS

Minikel, Eric, "Measuring Per-Mile Risk for Pay-as-You-Drive Automobile Insurance," CAS Ratemaking & Product Management Seminar, Mar. 20, 2012, 43 pages.

Giovanni Vaia, et al., "Vehicle Telematics at an Italian Insurer: New Auto Insurance Products and a New Industry Ecosystem," MIS Quarterly Executive, Sep. 2012, pp. 113-125.

"Introducing Pay-Per-Mile Insurance—Affordable Car Insurance," retrieved at https://www.metromile.com on Apr. 26, 2018.

Sep. 22, 2020—U.S. Notice of Allowance—U.S. Appl. No. 16/452,181.

Nov. 12, 2020—U.S. Notice of Allowance—U.S. Appl. No. 16/452,181.

* cited by examiner

UTILIZING VEHICLE TELEMATICS TO DETECT, EVALUATE, AND RESPOND TO DRIVING BEHAVIORS

CROSS-REFERENCE TO RELATED APPLICATIONS

This application is a continuation of U.S. patent application Ser. No. 16/452,181 entitled "Utilizing Vehicle Telematics to Detect, Evaluate, and Respond to Driving Behaviors," and filed on Jun. 25, 2019, which is incorporated by reference herein in its entirety.

TECHNICAL FIELD

The present application generally relates to data processing for vehicles. More specifically, the present application relates to data processing operations for monitoring the operation of a vehicle. Some aspects of the present application relate to determining vehicle distance traveled during a segment of interest. Other aspects of the present application relate to utilizing stored data characterizing previous driver performance. Additional aspects of the present application relate to using inertial sensors to detect vehicle speed and acceleration.

BACKGROUND

Insurance coverage for vehicles has become more complicated than in the past due to the changing nature in which people use vehicles. For example, a vehicle may be used for personal use or for ride sharing. Additionally, an owner of a vehicle may share the vehicle with a third party. Each type of vehicle use may carry different risks. And thus different types and scopes of insurance coverage may be demanded. The use of a vehicle for different purposes may be a fluid, continual flow back and forth between different types of use. For example, a vehicle owner may participate in a ride sharing service, utilizing the vehicle for both personal use and to provide transit services for others. The vehicle owner may alternate between being for hire and not for hire during a single driving session. As another example, the vehicle owner may participate in a vehicle sharing service, renting the vehicle to third parties that utilize the vehicle for personal use and/or ride sharing services. From the perspective of insurance companies, there remains a challenge to determine how a vehicle is being used at any given moment and what the corresponding scope of insurance coverage should be for that use. Furthermore, some current insurance customers may desire policies that provide coverage on an as-needed basis, i.e., only when the vehicle is in use.

Moreover, insurance risks may vary from driver to driver based on driving habits. Some drivers may be considered to be "good" drivers by exhibiting safe driving behaviors, while other drivers may be considered to be "bad" drivers by exhibiting risky driving behaviors (e.g., speeding, fast acceleration, hard braking, sharp turns, etc.). From the perspective of insurance companies, there remains the challenge to detect driving behaviors such that the degrees of the risks may be reflected in the cost of insurance coverage (e.g., lower costs for "good" drivers). Vehicle telematics technology may be leveraged to address these challenges.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to using vehicle telematics to detect, evaluate, and respond to driving behaviors. A vehicle telematics device may generate vehicle telematics information that characterizes the operation of a vehicle by a driver. For example, the vehicle telematics information may characterize various driving behaviors of the driver during a trip in a vehicle. Such driving behaviors may include speed, acceleration, turning, and braking. The vehicle telematics information may also characterize aspects of a trip in the vehicle. Such aspects of the trip may include distance traveled, duration, and location. These aspects of the trip may correspond to a particular segment of the trip or the entire trip. The vehicle telematics information may also characterize the purpose of the trip. Such purposes may include use of the vehicle for personal use, for ride sharing purposes, or vehicle sharing purposes. The vehicle telematics information may also indicate the number of passengers in the vehicle during the trip.

The driving behaviors observed during a trip may be evaluated and characterized as "good"/"positive" driving behaviors or "bad"/"negative" driving behaviors. For example, "good"/"positive" driving behaviors may include driving at speeds that meet specified speed limits as well as smooth and controlled acceleration, turning, and braking that meet respective inertial thresholds. Similarly, "bad"/"negative" driving behaviors may include excessive vehicle speeds as well as harsh acceleration, turning, or braking, e.g., those that exceed inertial thresholds.

The driving behaviors may be observed for multiple trips in the vehicle and across multiple observation periods. A rate to charge a driver may be based on the driving behaviors observed during an evaluation period. The evaluation period may include one or more observation periods, e.g., a series of contiguous observation periods or a set of individual observation periods. The determined rate to charge the driver may apply to one or more observation periods, e.g., a completed observation period or an upcoming observation period. The rate to charge a driver may fluctuate across observation periods based on the driving behaviors observed across those observation periods. For example, the driver may be charged a relatively lower rate based on observing "good"/"positive" driving behaviors. Likewise, the driver may be charged a relatively higher rate based on observing "bad"/"negative" driving behaviors.

The rate to charge the driver may be selected from a range of rates associated with a driver. For example, the rate to charge the driver may be selected from the lower end of the range based on observing "good"/"positive" driving behaviors or from the higher end of the range based on observing "bad"/"negative" driving behaviors. Multiple ranges of rates may be associated with the driver. For example, one range of rates may be used to determine the rate to charge the driver for personal use of the vehicle while another range of rates may be used to determine the rate to charge the driver based on the use of the vehicle in a ride sharing or vehicle sharing scenario.

The driving behaviors may be observed and evaluated in real-time during a trip. The rate to charge the driver may also be determined and provided to the driver in real-time during the trip. The determined rate to charge the driver may be presented to the driver upon or after completing a particular segment of the trip. The determined rate to charge the driver may also be presented to charge the driver at or before beginning a new segment of the trip. Multiple rates to charge the driver may be respectively determined for individual segments of the trip. The determined rates to charge the driver for the segments of the trip may be presented to the driver upon or after completing the trip. The determined rate(s) to charge the driver may apply to each segment of a trip (e.g., a rate per segment) or to individual segments of the trip (e.g., a rate for a segment).

The details of these and other embodiments of the invention are set forth in the accompanying drawings and description below. Other features and advantages of aspects of the invention will be apparent from the description and drawings.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
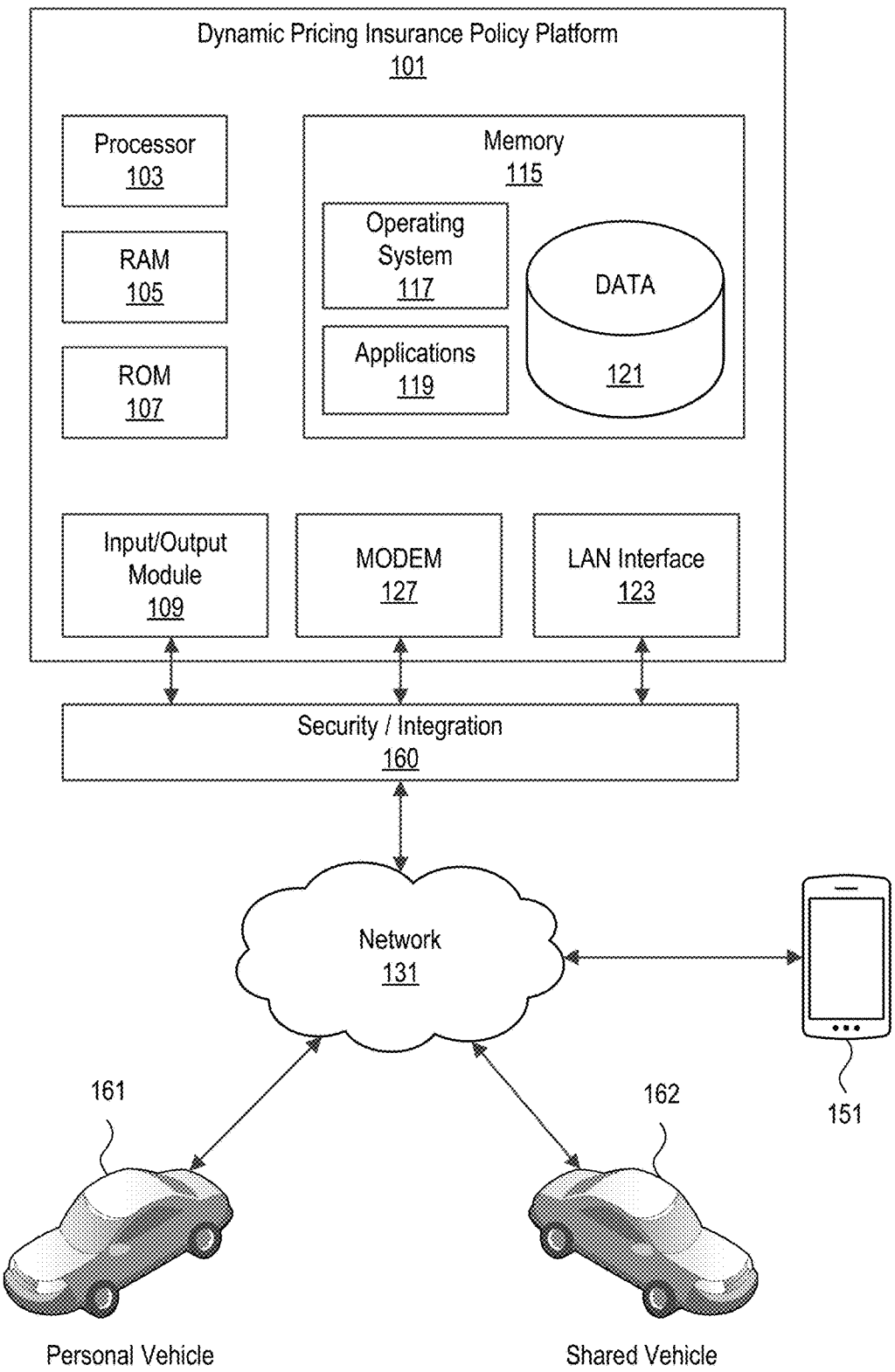
FIG. 1A provides a block diagram of an example dynamic pricing insurance policy system.

The present disclosure describes techniques for utilizing vehicle telematics to evaluate driving behaviors and respond to them. Responses may vary. For example, responses may include identifying the appropriate insurance policy and scope of coverage to apply to a particular driving session (or portion thereof). Responses may also include determining an appropriate cost of insurance coverage for a driving session (or portion thereof) and/or an appropriate cost of insurance coverage for a policy period (or portion thereof). By utilizing vehicle telematics to detect and evaluate driving behaviors, insurance companies can provide policies and coverage tailored to the particular needs of insurance customers. In turn, those customers can benefit from opportunities to reduce their expenses by exhibiting safe driving behaviors.

One type of insurance policy made possible by utilizing vehicle telematics to detect and evaluate driving behaviors is referred to herein as a "dynamic pricing" insurance policy. This type of policy may, for example, provide insurance coverage at a specified range of insurance rates. The range may apply to a portion of the period during which the insurance policy is active (the "policy period") and/or to a segment of a driving session. The segment may be specified in terms of distance (e.g., one mile, one half-mile, one-tenth mile, etc.) As an example, a dynamic pricing insurance policy may specify a range of $0.02-0.20. The pricing of this insurance policy is "dynamic" in the sense that the rate ultimately charged to the insurance customer is selected from the range specified in the policy. The rate selected may thus apply to a particular portion of the policy period or driving session. The rates for corresponding portions of a driving session may be selected and applied in real-time. As discussed further below, the rate selected from the range may depend on the driving behaviors observed. Using the example above, a rate of $0.05 may be selected and charged to the insurance customer for a portion of the policy period or driving session based on observing safe driving behaviors while a rate of $0.18 may be selected and charged based on observing risky driving behaviors.

Vehicle telematics may also be utilized to determine the appropriate policy and scope of coverage to apply to different types of usage scenarios. Vehicles may be utilized for personal use, for ride sharing services, and for vehicle sharing services. Accordingly, use of a vehicle may be by the vehicle owner or a third-party. Ride sharing services are those in which a driver of a vehicle has been hired to provide a trip for the passenger(s) of the vehicle. Vehicle sharing services are those in which an owner of a vehicle shares the usage of the vehicle with a third party. Moreover, vehicle sharing may be combined with ride sharing in which a vehicle owner rents the vehicle to a third-party to provide ride sharing services. A single driving session may alternate between these usage scenarios. For example, a vehicle owner may initiate a driving session for personal use (e.g., to run errands), then activate a "for hire" status to provide ride sharing services during that driving session, and subsequently activate a "not for hire" status to utilize the vehicle for personal use for the remainder of the driving session. A third-party may similarly utilize the vehicle for both personal use and a ride sharing service in a vehicle sharing scenario. As described in further detail below, vehicle telematics may be utilized to determine the current usage scenario, detect and log a change from one usage scenario to another, and determine the appropriate policy, coverage, and charges to apply to the various usage scenarios.

Additional aspects and advantages will be appreciated upon review of the disclosures set forth in further detail below.

Referring now to FIG. 1A, a block diagram of an example dynamic pricing insurance policy system 100 is shown. The system 100 includes a dynamic pricing insurance policy platform 101 that is in signal communication with one or more vehicles 161 and 162. Such vehicles may include the personal vehicle 161 of the vehicle owner as well as shared vehicle 162 that is shared by the vehicle owner with a third-party. It should be appreciated that personal vehicle 161 may or may not be shared with another driver. If personal vehicle 161 is shared with another driver, e.g., as part of a car-sharing service or other sharing arrangement, then personal vehicle 161 may likewise be referred to as a shared vehicle. Similarly, shared vehicle 162 may be referred to as such when the vehicle is currently shared with someone other than the owner of the vehicle, e.g., as part of a car-sharing service or other sharing arrangement. It should also be appreciated that the shared vehicle 162 may be the personal vehicle of an individual or belong to a fleet of vehicles owned by an entity such as a car-sharing company that provides car-sharing services. The dynamic pricing insurance policy platform 101 may also be in signal communication with one or more computing devices 151 (e.g., mobile computing devices) of potential and/or active drivers (e.g., vehicle owners, third-parties).

The dynamic pricing insurance policy platform 101 may include one or more special-purpose computing devices configured and programmed to provide and enforce dynamic pricing insurance policies. As described in further detail below, such functionality may include, for example, identifying and tracking vehicle usage scenarios, determining the appropriate insurance policy and coverage to apply to a particular usage scenario, receiving and evaluating information characterizing observed driving behaviors, and determining an appropriate insurance rate to charge based on those behaviors. The dynamic pricing insurance policy platform 101 may exchange communications with the vehicles 161 and 162 as well as the computing device(s) 151 in order to determine a current, upcoming, and/or previous usage scenario. Communications may also be exchanged to obtain the information characterizing the driving behaviors, provide information about the applicable insurance policy and coverage, and provide information about cost ranges and rates.

The dynamic pricing insurance policy platform 101 may have a processor 103 for controlling overall operation of the platform 101 and its associated components, including RAM 105, ROM 107, input/output module 109, and memory 115. The dynamic pricing insurance policy platform 101, along with one or more additional devices (e.g., terminals 151, 161-162, security and integration hardware 160) may correspond to any of multiple systems or devices described herein, such as personal mobile devices, vehicle-based computing devices, insurance systems servers, insurance policy provider servers, insurance policy servers, internal data sources, external data sources, and/or other various devices in an insurance policy system. These various computing systems may be configured individually or in combination, as described herein, for receiving signals and/or transmissions from one or more computing devices, the signals or transmissions including data related to location of a vehicle, operating parameters of a vehicle, operating parameters of vehicles in a same or similar location to the vehicle, and/or the like, processing the signals or transmissions to determine a location of the vehicle, a cause of an issue associated with the vehicle, and/or the like, using the devices of the insurance policy systems described herein. In addition to the features described above, the techniques described herein also may be used for generating and displaying one or more different types of notifications, transmitting a request for assistance to a service center computing device, and/or the like.

Input/Output (I/O) 109 may include a microphone, keypad, touch screen, and/or stylus through which a user of the dynamic pricing insurance policy platform 101 may provide input, and may also include one or more of a speaker for providing audio output and a video display device for providing textual, audiovisual and/or graphical output. Software may be stored within memory 115 and/or storage to provide instructions to processor 103 for enabling platform 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer-readable instructions, data structures, program modules or other data. Certain devices and systems within dynamic pricing insurance policy systems may have minimum hardware requirements in order to support sufficient storage capacity, processing capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a platform 101 (e.g., a personal mobile device 101, vehicle-based device 101, dynamic pricing insurance policy server 101, etc.), in order to receive and analyze the signals, transmissions, etc. including location information, vehicle operating information, and/or the like, determine a location of the vehicle, determine a cause of an issue associated with the vehicle, generate and transmit notifications, and/or the like, using the various devices of the dynamic pricing insurance policy systems. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components may allow the platform 101 to execute a series of computer-readable instructions, for example, receive signals or transmissions including location information, vehicle operation information, scan for diagnostic codes, and/or the like, to determine a location of the vehicle, determine a cause of an issue associated with the vehicle, control amount and type of data received, and/or the like.

The computing device (e.g., a personal mobile device, vehicle-based system, insurance system server, dynamic pricing insurance policy server, etc.) may operate in a networked environment 100 supporting connections to one or more remote computers, such as terminals 151, 161, and 162. Such terminals may be personal computers or servers (e.g., home computers, laptops, web servers, database servers), mobile communication devices 151 (e.g., mobile phones, tablet computers, etc.), vehicle-based computing systems 161, 162 (e.g., on-board vehicle systems, telematics devices, mobile phones or other personal mobile devices within vehicles), and/or the like, each of which may include some or all of the elements described above with respect to the dynamic pricing insurance policy platform 101. The network connections 131 depicted in FIG. 1 include a local area network (LAN), a wide area network (WAN), a wireless telecommunications network, and/or other networks. When used in a LAN networking environment, the computing device 101 may be connected to the LAN through a network interface or adapter 123. When used in a WAN networking environment, the computing device 101 may include a modem 127 or other means for establishing communications over the WAN, such as the Internet. When used in a wireless telecommunications network, the computing device 101 may include one or more transceivers, digital signal processors, and additional circuitry and software for communicating with wireless computing devices (e.g., mobile phones, portable customer computing devices, vehicle-based computing devices and systems, etc.) via one or more network devices (e.g., base transceiver stations) in the wireless network.

Also illustrated in FIG. 1 is a security and integration layer 160, through which communications are sent and managed between the device 101 (e.g., a personal mobile device, a vehicle-based computing device, a dynamic pricing insurance policy server or computing platform, an intermediary server and/or external data source servers, etc.) and the remote devices (e.g., 151, 161, and 162) and remote networks (e.g., 131). The security and integration layer 160 may comprise one or more separate computing devices, such as web servers, authentication servers, and/or various networking components (e.g., firewalls, routers, gateways, load balancers, etc.), having some or all of the elements described above with respect to the computing device 101. As an example, a security and integration layer 160 of a server 101 may comprise a set of web application servers configured to use secure protocols and to insulate the device 101 from external devices 151, 161, and 162. In some cases, the security and integration layer 160 may correspond to a set of dedicated hardware and/or software operating at the same physical location and under the control of same entities as device 101. For example, layer 160 may correspond to one or more dedicated web servers and network hardware in a vehicle and driver information datacenter or in a cloud infrastructure supporting cloud-based vehicle identification, location identification, vehicle operational parameters identification, issue detection, and/or the like. In other examples, the security and integration layer 160 may correspond to separate hardware and software components which may be operated at a separate physical location and/or by a separate entity.

As discussed below, the data transferred to and from various devices in a dynamic pricing insurance policy system 100 may include secure and sensitive data, such as confidential vehicle operation data, insurance policy data, and confidential user data from drivers and passengers in vehicles. Therefore, it may be desirable to protect transmissions of such data by using secure network protocols and encryption, and also to protect the integrity of the data when stored on the various devices within a system, such as personal mobile devices, vehicle-based devices, insurance servers, dynamic pricing insurance policy servers, external data source servers, or other computing devices in the system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in an electronic display system 100. Data may be transmitted through the security and integration layer 160, using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In other examples, one or more web services may be implemented within the various devices 101 in the system 100 and/or the security and integration layer 160. The web services may be accessed by authorized external devices and users to support input, extraction, and manipulation of the data (e.g., vehicle data, driver data, location data, dynamic pricing insurance policy data, etc.) between the various devices 101 in the system 100. Web services built to support a personalized display system may be cross-domain and/or cross-platform, and may be built for enterprise use. Such web services may be developed in accordance with various web service standards, such as the Web Service Interoperability (WS-I) guidelines. In some examples, driver data, vehicle data, location data, dynamic pricing insurance policy data and/or dynamic pricing insurance policy data analysis web service, and/or the like, may be implemented in the security and integration layer 160 using the Secure Sockets Layer (SSL) or Transport Layer Security (TLS) protocol to provide secure connections between servers 101 and various clients 151, 161, and 162. SSL or TLS may use HTTP or HTTPS to provide authentication and confidentiality. In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a database of driver data, database of vehicle information, database of location information, database of dynamic pricing insurance policy information, etc.) is cached in a separate smaller database on an application server separate from the database server (e.g., at a personal mobile device, vehicle-based data, or intermediary network device or cache device, etc.). For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of dynamic pricing insurance policy systems, such as faster response times and less dependence on network conditions when transmitting and receiving driver information, vehicle information, location information, dynamic pricing insurance policy information, and/or the like.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices in dynamic pricing insurance policy system components described herein may be configured to communicate using any of these network protocols or technologies.

Additionally, one or more application programs 119 may be used by the various computing devices 101 within a dynamic pricing insurance policy system 100 (e.g., vehicle data, driver data, location data, dynamic pricing insurance policy data, and/or dynamic pricing insurance policy analysis software applications, etc.), including computer executable instructions for receiving and analyzing various signals or transmissions including location information, vehicle operating data, other vehicle operating data, and/or the like, determining a location of a vehicle, determining a cause of an issue, controlling an amount or type of data transmitted or received and the like.

The dynamic pricing insurance policy platform 101 may communicate with the vehicles 161, 162, and/or the computing device(s) 151 in various manners, such as via one or more communication links. The dynamic pricing insurance policy platform 101 may receive data (e.g., related to vehicle usage scenarios, driving behaviors, etc.) from the vehicles 161, 162. Communications from a vehicle (e.g., the vehicles 161, 162) may comprise any type of data associated with the vehicle. For example, as further discussed in connection with FIG. 1B, the communications from the vehicle may comprise communications from a mobile application implemented on a mobile computing device (e.g., 151) located in the vehicle, communications from an on-board device installed in the vehicle, etc.

Figure 1B:
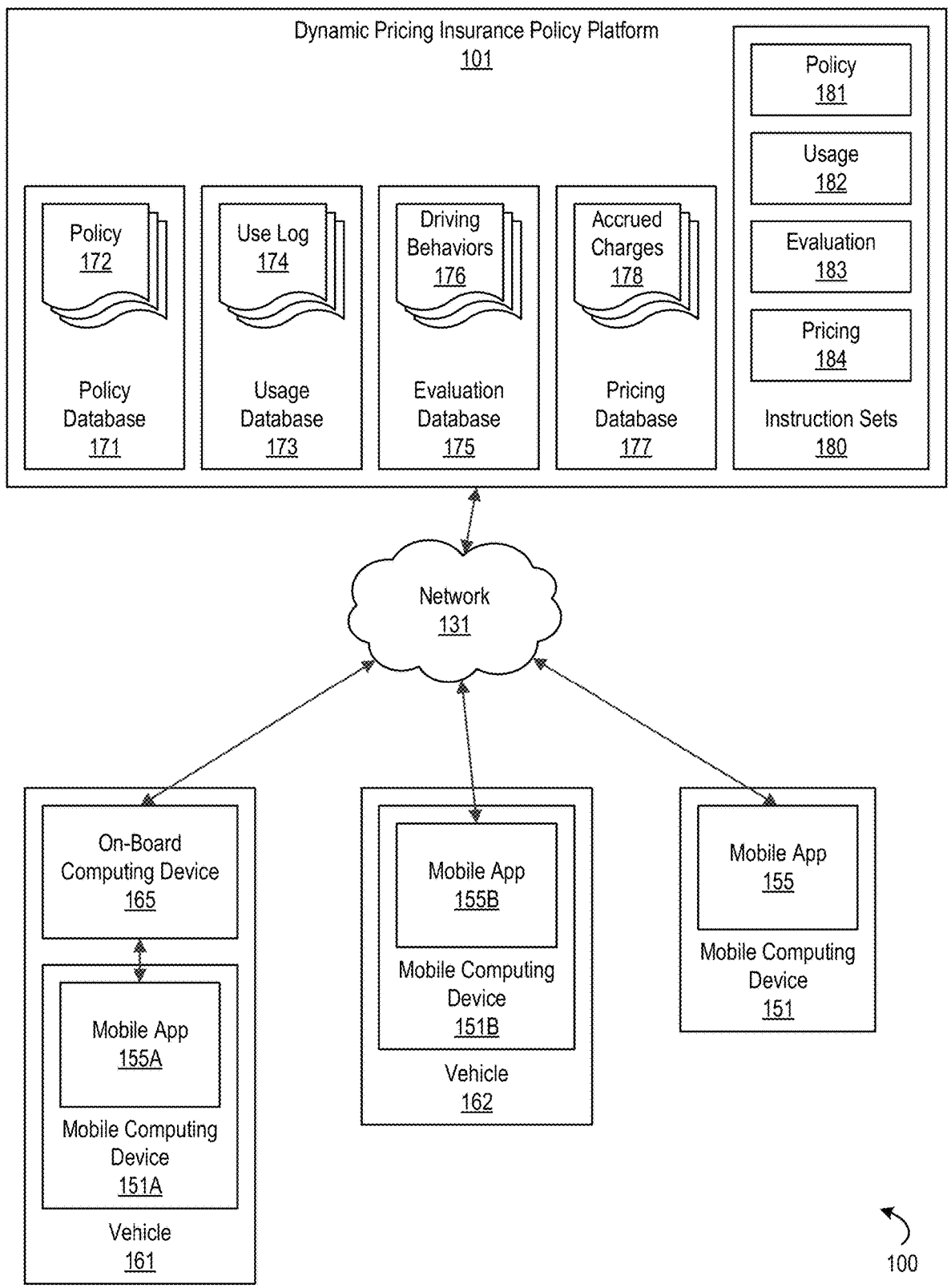
FIG. 1B provides another block diagram of the example dynamic pricing insurance policy system of FIG. 1A.

FIG. 1B provides another block diagram of the example dynamic pricing insurance policy system of FIG. 1A. In FIG. 1B, example components of the dynamic pricing insurance policy platform 101, vehicles 161 and 162, and the mobile computing device 151 are shown. It should be appreciated that, for the sake of clarity, not all components are illustrated in FIG. 1B and that additional or alternative components may be included in particular implementations.

A vehicle (e.g., the vehicle 161) may comprise, for example, an on-board computing device 165 (e.g., attached to diagnostic ports of the vehicle 161). The on-board computing device 165 may comprise, for example, a wireless (e.g., cellular) communication interface for communicating with a network (e.g., the network 131). The on-board computing device 165 may be configured to communicate with a mobile application 155A of a mobile computing device 151A in the vehicle 161. The on-board computing device 165 may communicate with the mobile application 155A via any type of communication link, such as Bluetooth, Universal Serial Bus (USB) connection, etc. The mobile application 155A may comprise, for example, an insurance application configured to identify an insurance customer to the dynamic pricing insurance policy platform 101. The mobile application 155A may be configured to detect driving behaviors using sensors (e.g., accelerometers mobile computing device, etc.). Various aspects of determining driving behaviors using mobile computing devices are described in U.S. patent application Ser. No. 14/188,046, filed on Feb. 24, 2014, and entitled "Providing Rewards Based On Driving Behaviors Detected By A Mobile Computing Device," and U.S. patent application Ser. No. 15/614,262, filed on Jun. 5, 2017, and entitled "Risk Behavior Detection Methods Based On Tracking Handset Movement Within A Moving Vehicle," both of which are commonly assigned to Allstate Insurance Company and are hereby incorporated by reference in their entirety.

The mobile computing device 151A in the vehicle 161 may transmit driving behavior information directly to the dynamic pricing insurance policy platform 101 and/or via the on-board computing device 165. The mobile computing device 151A may comprise additional or alternative applications, such as ride sharing applications, vehicle sharing applications, and the like. The mobile application 155A (e.g., an insurance application in communication with the dynamic pricing insurance policy platform 101) may communicate with ride sharing applications, vehicle sharing applications, and/or other types of applications implemented on the mobile computing device 151A, to determine usage scenarios (e.g., for hire, not for hire, shared, not shared, etc.) associated with the vehicle 161. For example, if the for hire usage scenario is activated by a ride sharing application implemented on the mobile computing device 151A, the ride sharing application may inform the mobile application 155A of the activation of the for hire usage scenario. The mobile application 155A may in turn inform the dynamic pricing insurance policy platform 101 of the activation of the for hire usage scenario.

Similarly, if the shared vehicle usage scenario is activated by a vehicle sharing application implemented on the mobile computing device 151A, the vehicle sharing application may inform the mobile application 155A of the activation of the shared vehicle usage scenario. The mobile application 155A may in turn inform the dynamic pricing insurance policy platform 101 of the activation of the shared vehicle usage scenario. Additionally or alternatively, the ride sharing application, the vehicle sharing application, and/or any other application may communicate with the dynamic pricing insurance policy platform 101 directly or via the on-board computing device 165. Additionally or alternatively, one mobile application (e.g., the mobile application 155A) may combine insurance functionalities, ride sharing functionalities, and/or vehicle sharing functionalities, and may send information about vehicle usage scenarios to the dynamic pricing insurance policy platform 101.

A vehicle (e.g., the vehicle 162) may comprise, for example, a mobile computing device 151B. The mobile computing device 151B may implement a mobile application 155B (e.g., an insurance application). The mobile computing device 151B (and/or the mobile application 155B implemented thereon) may be configured to communicate with the dynamic pricing insurance policy platform 101 (e.g., regarding driving behaviors as determined by the mobile computing device 151B). The mobile computing device 151B may comprise additional or alternative applications, such as ride sharing applications, vehicle sharing applications. The mobile application 155B (e.g., an insurance application in communication with the dynamic pricing insurance policy platform 101) may communicate with ride sharing applications, vehicle sharing applications, and/or other types of applications implemented on the mobile computing device 151B, to determine usage scenarios (e.g., for hire, not for hire, shared, not shared, etc.) associated with the vehicle 162. For example, if the for hire usage scenario is activated by a ride sharing application implemented on the mobile computing device 151B, the ride sharing application may inform the mobile application 155B of the activation of the for hire usage scenario. The mobile application 155B may in turn inform the dynamic pricing insurance policy platform 101 of the activation of the for hire usage scenario.

Similarly, if the shared vehicle usage scenario is activated by a vehicle sharing application implemented on the mobile computing device 151B, the vehicle sharing application may inform the mobile application 155B of the activation of the shared vehicle usage scenario. The mobile application 155B may in turn inform the dynamic pricing insurance policy platform 101 of the activation of the shared vehicle usage scenario. Additionally or alternatively, the ride sharing application, the vehicle sharing application, and/or any other application may communicate with the dynamic pricing insurance policy platform 101 directly. Additionally or alternatively, one mobile application (e.g., the mobile application 155B) may combine insurance functionalities, ride sharing functionalities, and/or vehicle sharing functionalities, and may send information about vehicle usage scenarios to the dynamic pricing insurance policy platform 101.

A mobile computing device (e.g., the mobile computing device 151) may implement a mobile application 155. The mobile application 155 may comprise, for example, one or more of an insurance application, a ride sharing application, a vehicle sharing application, or the like. The mobile computing device 151 (and/or the mobile application 155) may be used by a third party, for example, to identify vehicles available for sharing.

The dynamic pricing insurance policy platform 101 may comprise instruction sets and/or data storage used to implement dynamic pricing insurance policies. The dynamic pricing insurance policy platform 101 may comprise, for example, one or more policy databases (e.g., policy database 171), one or more usage databases (e.g., usage database 173), one or more evaluation databases (e.g., evaluation database 175), one or more pricing databases (e.g., pricing database 177), and one or more instruction sets (e.g., instruction sets 180). The components of the dynamic pricing insuring policy platform 101 are only provided by way of example to illustrate functionalities of the platform. The dynamic pricing insuring policy platform 101 may comprise additional and/or alternative instruction sets, additional and/or alternative databases, etc. In some examples, a single database may be used to store all types of data. The dynamic pricing insuring policy platform 101 may be configured to track vehicle usage scenarios, determine corresponding insurance policies to apply to the vehicle usage scenarios, determine corresponding insurance rates to charge for the vehicle usage scenarios, receive information characterizing driving behaviors, determine appropriate insurance rates based on observed driving behaviors, and/or the like.

The policy database 171 may store, for example, information related to insurance policies 172 (e.g., purchased by insurance customers). For example, multiple insurance policies may correspond to a single customer. Each of the multiple insurance policies may provide a particular type of coverage (e.g., personal policy, ride sharing policy, vehicle sharing policy, etc.). Additionally or alternatively, a single insurance policy may correspond to a single customer. The single insurance policy may provide different types of coverage (e.g., personal coverage, ride sharing coverage, vehicle sharing coverage). The customer may be, for example, the vehicle owner or a third party (e.g., who uses vehicle sharing services). An insurance policy 172 may specify a dynamic pricing range (e.g., $0.02-0.20 per segment) to account for different risks associated with different phases of ride sharing (e.g., idle (for hire, but not yet hired), passenger acquisition (traveling to pick up passenger(s)), on route (passenger(s) acquired and on route to destination(s), etc.). Insurance policies related to ride sharing may provide different scope of coverage depending on the phase of ride sharing.

The usage database 173 may store, for example, information related to usage scenarios associated with customers. For example, the usage database 173 may store one or more use logs 174 indicating one or more time periods that a particular customer uses his or her vehicle and usage scenarios corresponding to the one or more time periods. For example, for a particular customer "customer-1," the usage database 173 may store the following records: [customer-1, 01.01.2000, 8:30-13:30, personal], [customer-1, 01.01.2000, 13:30-16:30, ride sharing], [customer-1, 01.01.2000, 16:30-18:30, personal]. The records may indicate that customer-1 used his or her vehicle for personal use on Jan. 1, 2000, from 8:30 to 13:30, for ride sharing use on Jan. 1, 2000, from 13:30 to 16:30, and for personal use on Jan. 1, 2000, from 16:30 to 18:30.

As another example, for a customer "customer-2," the usage database 173 may store the following records: [customer-2, 01.02.2000, 8:00-8:15, ride sharing, idle], [customer-2, 01.02.2000, 8:15-8:20, ride sharing, passenger acquisition], [customer-2, 01.02.2000, 8:20-8:45, ride sharing, on route], [customer-2, 01.02.2000, 8:45-8:55, ride sharing, idle]. As another example, for a customer "customer-3," the usage database 173 may store the following records: [customer-3, 01.03.2000, 8:00-14:00, vehicle sharing].

The evaluation database 175 may store, for example, information related to driving behaviors 176 associated with customers. The evaluation database 175 may additionally or alternatively store information characterizing specific driving behaviors (e.g., instances of speeding, fast acceleration, sharp turning, hard braking, etc.). The evaluation database 175 may additionally or alternatively store information classifying observed driving behaviors as positive (e.g., "good" or "safe" driving behaviors) or negative (e.g., "bad" or "risky" driving behaviors). The classification of observed driving behaviors may be associated with corresponding segments (e.g., portion of policy period or distance traveled). For example, the evaluation database 175 may store the following records: [customer-1, 1st observation period, 01.01.2000-01.07.2000, positive], [customer-1, 2nd observation period, 01.08.2000-01.14.2000, negative]. Additionally or alternatively, the evaluation database 175 may store the following records: [customer-1, 1st segment, positive], [customer-1, 2nd segment, positive], [customer-1, 3rd segment, negative].

The pricing database 177 may store, for example, information related to accrued charges 178 associated with insurance customers. The charges may be accrued based on applying insurance rates to corresponding segments (e.g., portion of policy period or distance traveled) during vehicle use. For example, the pricing database 177 may store the following records: [customer-1, 1st observation period, 01.01.2000-01.07.2000, $0.05], [customer-1, 2nd observation period, 01.08.2000-01.14.2000, $0.17]. The records may indicate, for example, that during a first observation period (01.01.2000-01.07.2000), the customer, customer-1, may be charged at a rate of $0.05 per segment, and that during a second observation period (01.08.2000-

01.14.2000), the customer, customer-1, may be charged at a rate of $0.17 per segment. As another example, the pricing database 177 may store the following records: [customer-1, 1st segment, $0.04], [customer-1, 2nd segment, $0.04], [customer-1, 3rd segment, $0.11]. The records may indicate, for example, the customer, customer-1, may be charged $0.04 for a first segment, may be charged $0.04 for a second segment, and may be charged $0.11 for a third segment.

The instruction sets 180 may comprise, for example, a policy instruction set 181, a usage instruction set 182, an evaluation instruction set 183, and a pricing instruction set 184. The policy instruction set 181 may determine what policy applies based on current use of a vehicle (e.g., by a vehicle owner or by a third party), and may determine what coverage of the policy applies based on a current status (e.g., personal use usage scenario or ride sharing usage scenario (comprising an idle phase, a passenger acquisition phase, an on route phase)). The usage instruction set 182 may track the usage (e.g., identity of customer (owner, vehicle sharing driver), date/time, and/or use status (e.g., personal, ride sharing (idle, acquisition, on route), vehicle sharing). The evaluation instruction set 183 may track and evaluate driving behaviors (e.g., track driving events (speed, acceleration, braking, turning), assess as good/bad driving behaviors), and/or associate driving behaviors with segment (e.g., portion of policy period, segment traveled). The pricing instruction set 184 may calculate accrued charges based on rates applied to segments.

Figure 2A:
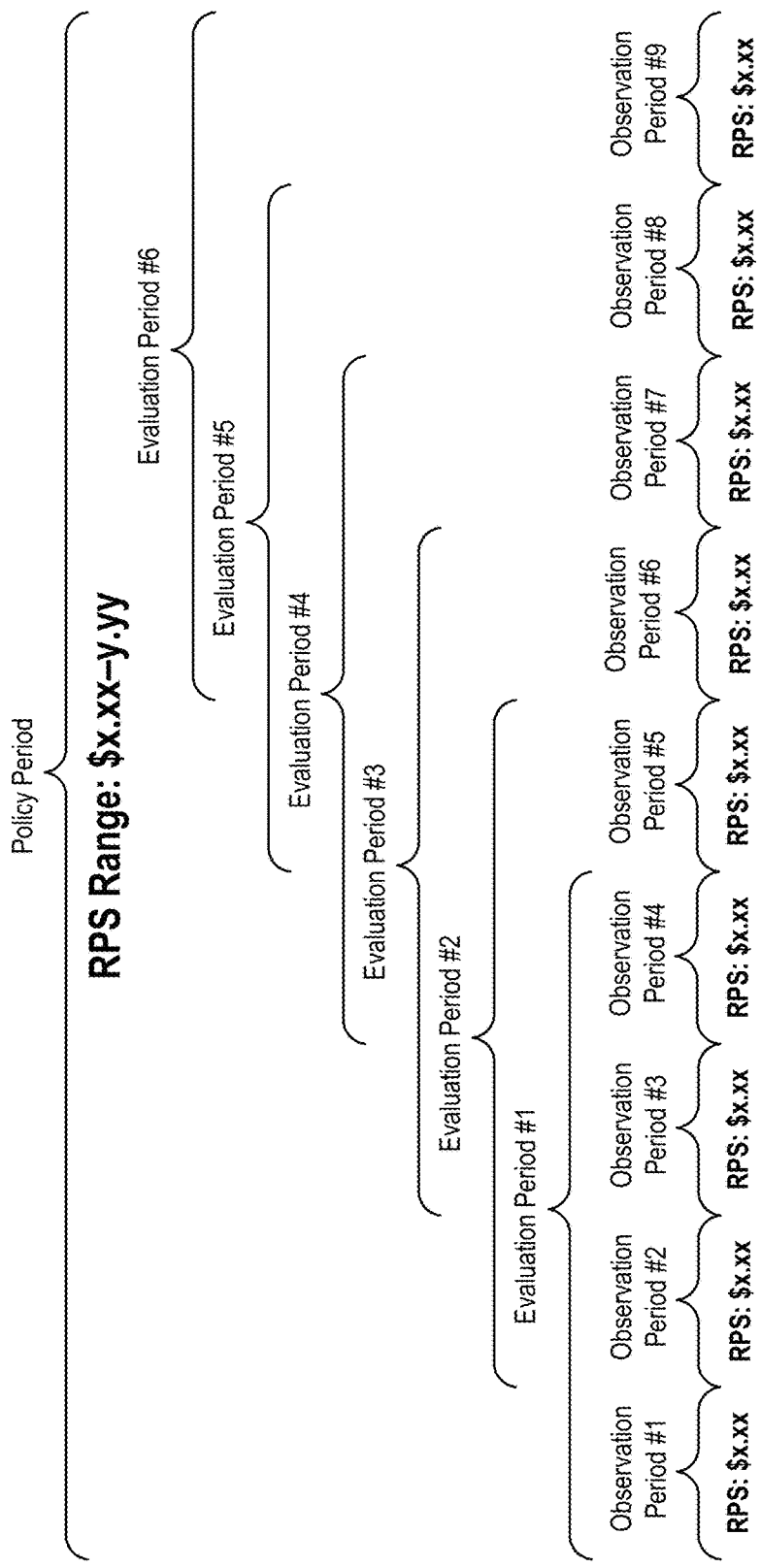
FIG. 2A provides a diagram of an example dynamic pricing insurance policy employing rates per segment in accordance with some aspects of the present disclosure.

FIG. 2A provides a diagram of a dynamic pricing insurance policy that employs rates per segment in accordance with some aspects of the present disclosure. In this example, the dynamic pricing insurance policy includes a rate per segment (RPS) range (e.g., $0.02-$0.20 per segment) that specifies the range of insurance rates that apply to each segment traveled during the policy period. As noted, the segments may be defined in terms of distance, e.g., one-tenth mile, one half-mile, one mile, and the like. The insurance customer, in this example, accrues charges for each segment within an observation period. The observation period may be defined in terms of the duration of portions of the policy period, e.g., one day, one week, one month, and the like. During the observation period, the insurance customer's driving behaviors are monitored. Each observation period thus receives an individual RPS (e.g., $0.10) based, at least in part, on the driving behaviors observed during that observation period and the RPS range of the customer's insurance policy. For example, "good" driving behaviors during the observation period may result in an RPS at the lower end of the RPS range, while "bad" driving behaviors may result in an RPS at the higher end of the RPS range. Furthermore, the observation period may receive an overall evaluation (e.g., "good" or "bad"). The charges accrued for a particular observation period are thus based on the RPS for that observation period and the segments traveled during that observation period (e.g., $0.10 per segment at 100 segments yields $10.00).

The RPS applied to a particular observation period may also be based on an evaluation period that accounts for the driving behaviors of one or more observation periods prior to the current (or most recently completed) observation period. As seen in FIG. 2A, for example, a policy period may include multiple evaluation periods. Each evaluation period may include multiple observation periods (e.g., four observation periods in this example). Accordingly, the RPS applied to the current (or most recently completed) observation period may be based on the driving behaviors observed during that observation period plus those observed during one or more previous observation periods. More generally, the RPS applied to an observation period, x, may be based on the driving behaviors observed during that observation period, x, plus x-n number of observation periods prior to that observation period, x, where n is >1. One concrete example may include observation periods having a duration of one week and an evaluation period of four weeks in which the RPS applied to the current (or most recently completed) week is based on the driving behaviors observed during that week plus those observed during the three previous weeks (the three previous observation periods).

As also seen in FIG. 2A, the evaluation periods in this example advance one observation period at a time over the course of the policy period. By way of example, the first evaluation period includes observation periods #1-4, the second evaluation period includes observation periods #2-5, the third evaluation period includes observation periods #3-6, and so forth. An evaluation period may include more or less observation periods in alternative implementations, e.g., anywhere between one observation period and the total number of observation periods of the policy period. Where an evaluation period requires more observation periods than have been completed (e.g., during the early portion of the policy period), those observation periods may receive a default RPS (e.g., the median of the RPS range) until a sufficient number of observation periods have been completed with which to evaluate the driving behaviors observed during those observation periods and calculate the corresponding RPS based on the RPS range.

By incrementally advancing the evaluation period one or more observation periods at a time, a gradual adjustment of the insurance customer's RPS may be achieved. The RPS for an observation period thus may be based on an average or general assessment of driving behaviors. For example, exhibiting generally "good" driving behaviors during an evaluation period may result in a relatively lower RPS for the current (or most recently completed) observation period, even if some "bad" driving behaviors were observed during the evaluation period. Similarly, exhibiting generally "bad" driving behaviors during an evaluation period may result in a relatively higher RPS for the current (or most recently completed) observation period, notwithstanding some "good" driving behaviors during the evaluation period. It will thus be appreciated that, in this example, exhibiting "good" driving behaviors over the course of multiple observation periods may lower the RPS to a greater degree than "good" driving behaviors over a single observation period. In this way, an insurance customer may gradually improve the RPS applied by exhibiting and continuing to exhibit "good" driving behaviors over time.

The evaluation period may apply the RPS to an observation period retroactively once that observation period has completed. In an alternative approach, the RPS may be applied proactively to an upcoming observation period. This proactive approach is shown using concrete examples in FIG. 2B.

Figure 2B:
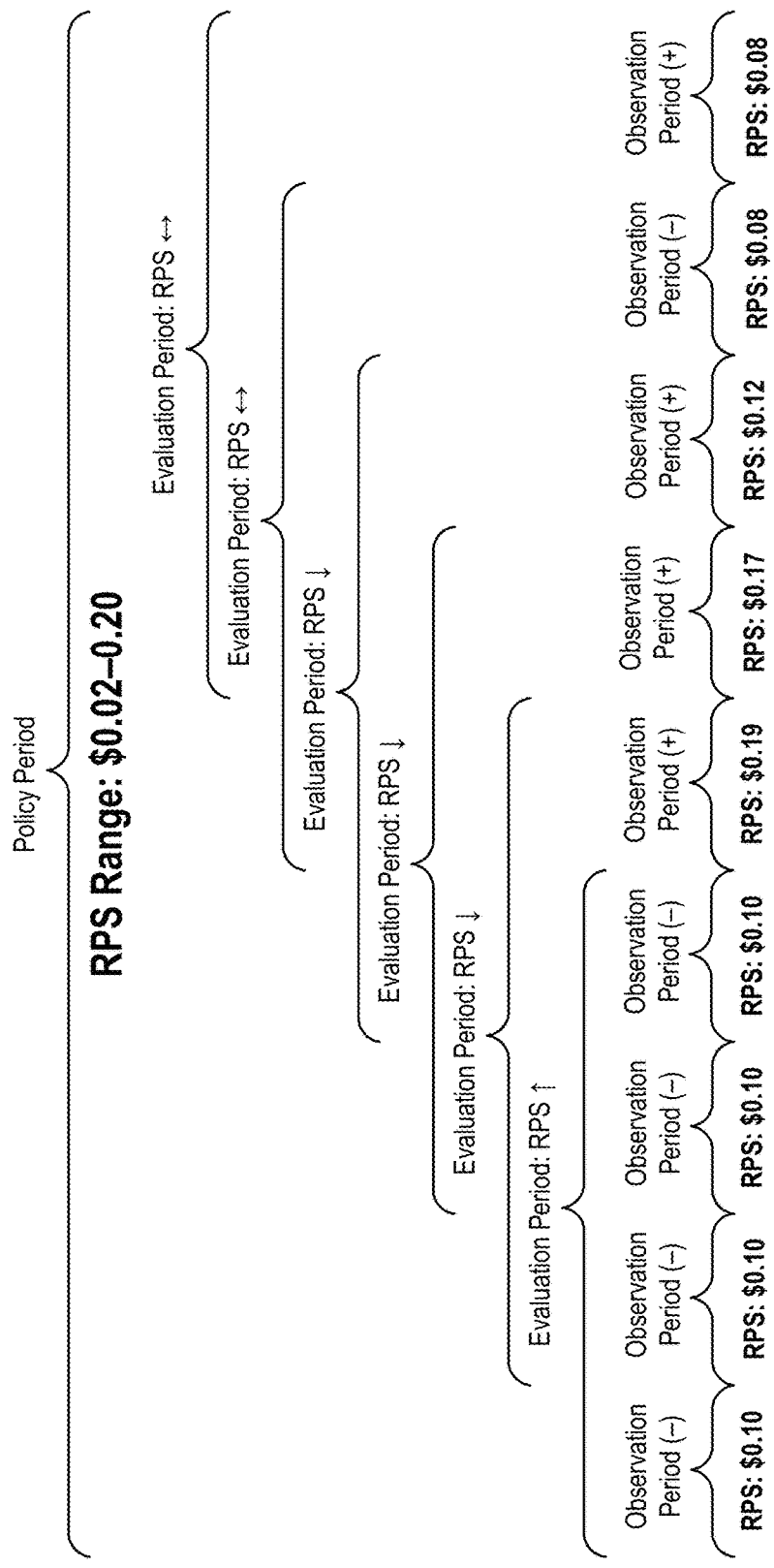
FIG. 2B provides a diagram of another example dynamic pricing insurance policy employing rates per segment in accordance with some aspects of the present disclosure.

FIG. 2B provides a diagram of another dynamic pricing insurance policy that employs rates per segment in accordance with some aspects of the present disclosure. As noted above, the dynamic pricing insurance policy shown in this example of FIG. 2B proactively applies a determined RPS to the next, upcoming observation period. Accordingly, each evaluation period may determine whether to increase the previous RPS (↑), decrease the previous RPS (↓), or keep the same RPS (↔) for the next, upcoming observation period. The determination of whether to increase, decrease, or preserve the previous RPS may be based on an evaluation of the driving behaviors observed during one or more observation periods. An observation period may receive an overall evaluation of the driving behaviors observed, e.g., "good" (positive, +) or "bad" (negative, −). Accordingly, the RPS for the next, upcoming observation period may depend on the number of "good" and "bad" observation periods for the relevant evaluation period. For example, if the evaluation period includes more "good" observation periods than "bad," then the RPS may be decreased for the next, upcoming observation period. Similarly, if the evaluation period includes more "bad" observation periods than "good," then the RPS may be increased for the next, upcoming observation period. Likewise, if the evaluation period includes the same number of "good" and "bad" observation periods, then the RPS may stay the same for the next, upcoming observation period. For each increase or decrease of the RPS, the result is within the RPS range for the policy period. This fluctuation of the RPS based on an evaluation of the driving behaviors observed during the observation periods of the evaluation periods during a policy period is shown by way of example in FIG. 2B.

In the example dynamic pricing insurance policy of FIG. 2B, the RPS range is $0.02-0.20. Each evaluation period, in this example, includes four observation periods. As described above, the driving behaviors for the initial observation periods of the policy period (e.g., #1-4) may receive a default RPS (e.g., $0.10). When the last observation period of the evaluation period is complete (e.g., #4), it is determined whether to increase, decrease, or preserve the RPS for the next, upcoming observation period. As seen in FIG. 2B, each of the initial observation periods received a negative (−) evaluation due to "bad" driving behaviors observed during those observation periods. The result of the first evaluation period, in this example, is thus an increase in the RPS for the next observation period (e.g., from $0.10 to $0.19). After the next observation period (e.g., #5) is complete, it is again determined whether to increase, decrease, or preserve the RPS. This second evaluation period, however, includes the most recently completed observation period (e.g., #5) and the three prior observation periods (e.g., #2-4). As seen in FIG. 2B, the most recently completed observation period (e.g., #5) received a positive (+) evaluation due to "good" driving behaviors observed during that observation period. This second evaluation period, therefore, includes three observation periods having a negative (−) evaluation and one observation period having a positive (+) evaluation. The result of this second evaluation period is thus a slight decrease in the RPS for the next observation period (e.g., from $0.19 to $0.17). Subsequent observation periods receiving positive (+) evaluations due to "good" driving behaviors may result in further decreases to the RPS (e.g., from $0.17 to $0.12) as the insurance customer accumulates a sequence of observation periods having positive (+) evaluations. It should be appreciated that the determination of whether to increase, decrease, or preserve an RPS may be based on a variety of factors and criteria. For example, an RPS may be preserved notwithstanding a negative (−) evaluation of the most recently completed observation period provided that some threshold number of previous observation periods of the evaluation period received positive (+) evaluations (e.g., at least the previous two observation periods receiving a positive (+) evaluation).

At the conclusion of the policy period, the insurance policy may be renewed with a new RPS range. The RPS range for the renewed policy period may be increased, decreased, or stay the same based on similar evaluations of the driving behaviors observed throughout the entire policy period. For example, if the number of observation periods receiving positive (+) evaluations exceed those receiving negative (−) evaluations over the course of the policy period, then the RPS range may be decreased for the renewed insurance policy (e.g., from $0.02-$0.15). On the other hand, if the number of observation periods receiving (−) evaluations exceed those receiving positing (+) evaluations, then the RPS range may be increased for the renewed insurance policy (e.g., from $0.05-$0.30). If the number of observation periods receiving positive (+) and negative (−) evaluations during the policy period is the same, then the RPS range may stay the same for the renewed policy period. In some examples, a threshold number or percentage observation periods receiving positive (+) or negative (−) evaluations may be required before the RPS range respective increases or decreases for the renewed insurance policy.

Figure 2C:
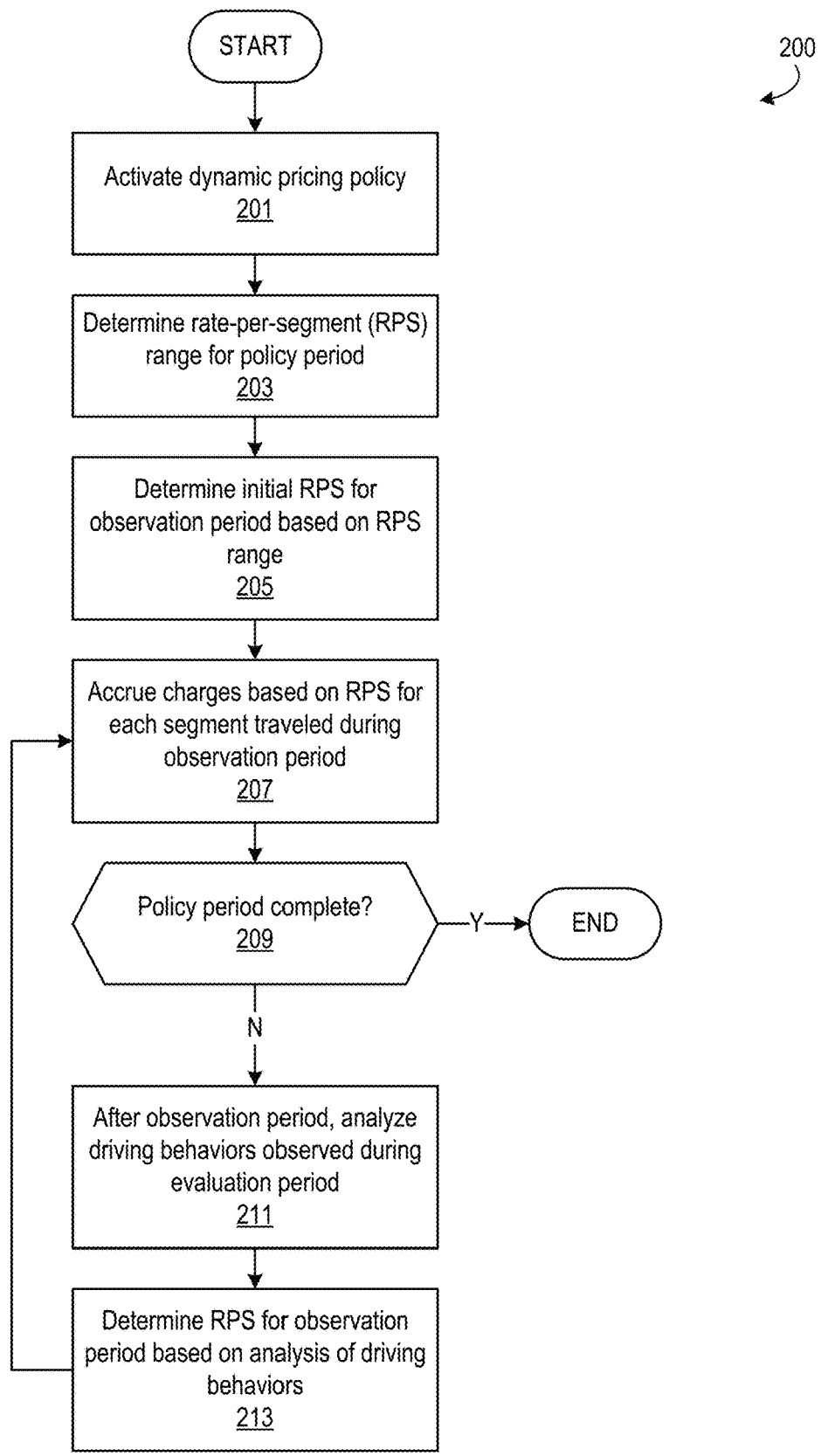
FIG. 2C provides a flowchart of example method steps for providing a dynamic pricing insurance policy in accordance with some aspects of the present disclosure.

FIG. 2C is a flowchart 200 of example method steps for providing a dynamic pricing insurance policy such as that described above with reference to FIGS. 2A-B. The method may be performed, for example, by one or more of the systems as discussed in connection with FIGS. 1A-1B. The steps of the method may be described as being performed by particular components and/or computing devices for the sake of simplicity, but the steps may be performed by any component and/or computing device. The steps of the method may be performed by a single computing device or by multiple computing devices. One or more steps of the method may be omitted, added, and/or rearranged as desired by a person of ordinary skill in the art.

In step 201, a computing device (e.g., the dynamic pricing insurance policy platform 101) may activate a dynamic pricing insurance policy for an insurance customer. The insurance customer may subscribe to (e.g., purchase) the dynamic pricing insurance policy for a policy period. The dynamic pricing insurance policy may be stored, for example, in the policy database 171 of the dynamic pricing insurance policy platform 101. For example, the policy database 171 may store a record indicating an identifier of the insurance customer and dynamic pricing insurance policy(s) corresponding to the insurance customer. The dynamic pricing insurance policy for the insurance customer may be activated, for example, when the policy period starts.

In step 203, the computing device may determine an RPS range for the dynamic pricing insurance policy for the insurance customer. The RPS range may be used for the policy period of the dynamic pricing insurance policy. The computing device may determine the RPS range, for example, based on the information stored in the policy database 171 of the dynamic pricing insurance policy platform 101. For example, a record, corresponding to the dynamic pricing insurance policy for the insurance customer, stored in the policy database 171 may specify an RPS range (e.g., $0.02-0.20 per segment). Additionally or alternatively, the record may specify RPS ranges for different usage scenarios and/or for different phases of a usage scenario.

In step 205, the computing device may determine, based on the RPS range as determined in step 203, an initial RPS for a first observation period for the insurance customer. The initial RPS may be selected from within the RPS range. The initial RPS may, for example, correspond to the median of the RPS range. In step 207, the computing device may, based on the initial RPS, accrue charges for each segment traveled by the insurance customer during the first observation period. For example, a second computing device (e.g., the on-board computing device 165, the mobile computing devices 151, 151A, 151B, etc.) and/or an application implemented thereon (e.g., the mobile application 155, 155A, 155B, etc.) may communicate with the computing device (e.g., the dynamic pricing insurance policy platform 101). For example, location information, driving behavior information, etc., associated with the insurance customer and/or his or her vehicle may be sent from the second computing device to the computing device. Based on the location information, the computing device may determine the quantity of segments that the insurance customer traveled during the first observation period. The accrued charges for the first observation period may, for example, correspond to the initial RPS multiplied by the quantity of segments. The determined accrued charges may be stored, for example, in the pricing database 177 of the dynamic pricing insurance policy platform 101.

In step 209, the computing device may determine whether the policy period for the dynamic pricing insurance policy for the insurance customer has been completed (e.g., expired). If the policy period for the dynamic pricing insurance policy for the insurance customer has been completed (step 209: Y), the method may end. If the policy period for the dynamic pricing insurance policy for the insurance customer has not been completed (step 209: N), the method may proceed to step 211. In step 211, the computing device may analyze driving behaviors observed during an evaluation period. The evaluation period may comprise, for example, the first observation period and/or preceding observation periods. The computing device may receive, from the second computing device, the driving behavior information associated with the insurance customer and/or his or her vehicle. The driving behavior information may be stored, for example, in the evaluation database 175 of the dynamic pricing insurance policy platform 101. The computing device may, for example, evaluate the driving behaviors for each observation period of the evaluation period. The computing device may classify a particular observation period as "positive" or "negative."

In step 213, the computing device may determine an RPS for an observation period following the first observation period (e.g., proactively). The determination may be based on, for example, the analysis of the driving behaviors during the evaluation period (e.g., comprising the first observation period). For example, the computing device may increase the RPS if the quantity of "positive" observation periods of the evaluation period satisfies (e.g., meets, exceeds, etc.) a predetermined threshold (e.g., three). The determined RPS may be used for calculating accrued charges for the next observation period. Additionally or alternatively, the computing device may determine an RPS for the first observation period (e.g., retroactively). For example, the computing device may use the determined RPS to calculate the accrued charges for the first observation period. Following step 213, the method may repeat step 207. For example, the computing device may determine accrued charges for the first observation period (e.g., if the RPS is determined retroactively), and/or may determine accrued charges for the observation period following the first observation period (e.g., if the RPS is determined proactively).

Figure 3A:
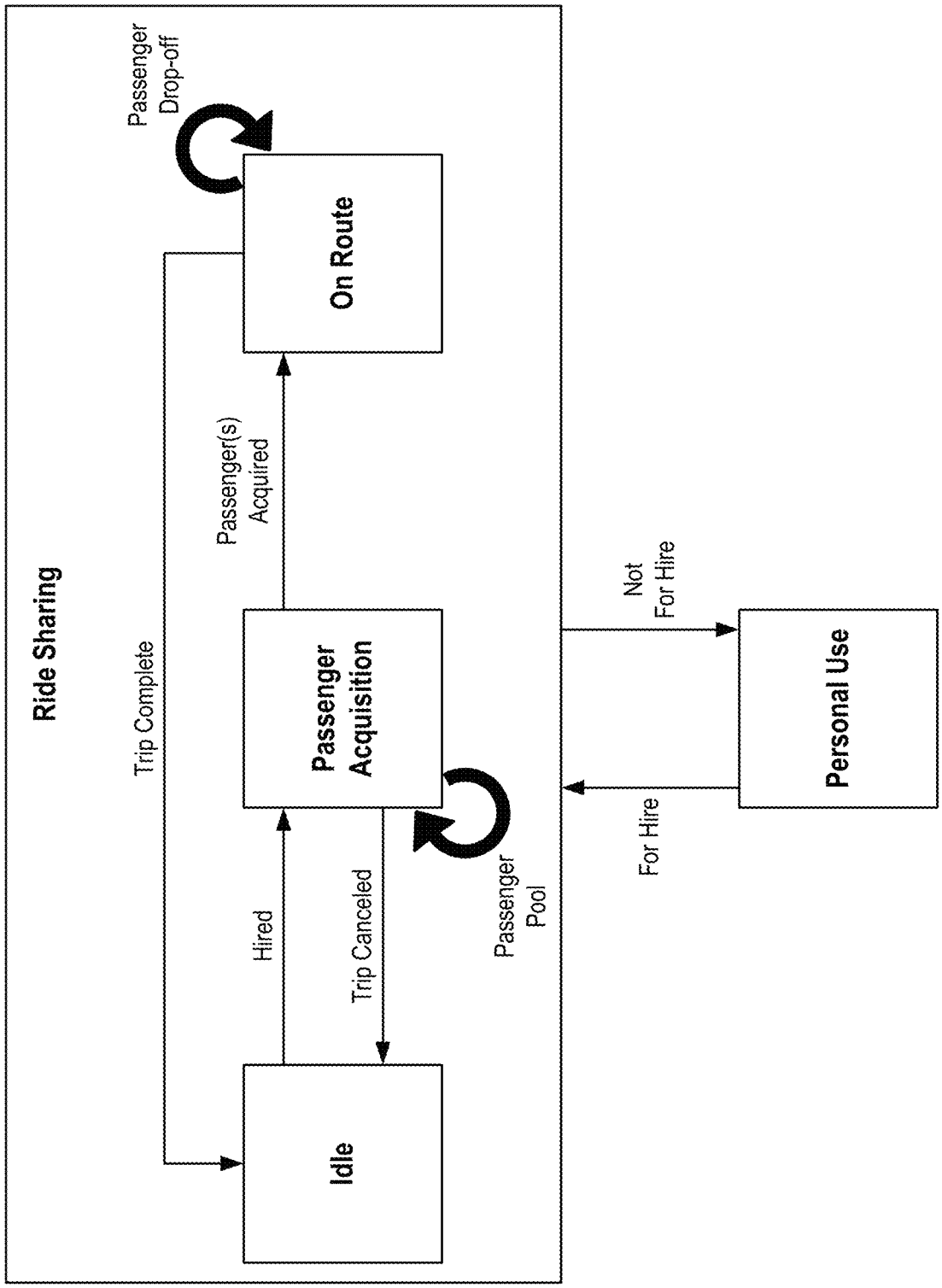
FIG. 3A provides a diagram of an example relationship between personal use insurance policy provisions and a ride sharing insurance policy provisions in accordance with some aspects of the present disclosure.

The features of a dynamic pricing insurance policy such as those described above may be included in personal use insurance policies as well as ride sharing insurance policies. Furthermore, the features of a personal use insurance policy and a ride sharing insurance policy may be combined in a combination insurance policy that provides different insurance coverage for each situation. For example, such a combination insurance policy may provide different insurance rates, features, and coverage depending on whether an insurance customer is operating a vehicle for personal use or for ride sharing purposes. Such differences account for the different types and levels of risk as well as the potential liabilities arising from each scenario. One challenge arising from these types of insurance policies (personal versus ride sharing policies or combination policies) is determining what insurance coverage is active and applies at any given date and time. As shown in FIG. 3A and discussed below, an insurance customer may continually alternate between personal use of a vehicle and use for ride sharing services. Whether an insurer can appropriately charge that insurance customer for the particular risk exposure arising from those different uses depends on having accurate records of the insurance customer's use of the vehicle.

FIG. 3A is a diagram of an example relationship between personal use insurance policy provisions and ride sharing insurance policy provisions. As seen in FIG. 3A, an insurance customer may switch between personal use of a vehicle and use of that vehicle for ride sharing purposes. In this regard, the insurance customer may switch between being "For Hire" and "Not For Hire." It will be appreciated that different levels and types of risk are associated with the use of a vehicle that is "For Hire" (e.g., for ride sharing) versus one that is "Not For Hire" (e.g., operated for personal use). Accordingly, the insurance customer's insurance policy (or policies) may provide different levels of insurance coverage depending on whether the insurance customer is operating a vehicle "For Hire" (in which the ride sharing insurance policy or provisions would apply) or "Not For Hire" (in which the personal use insurance policy or provisions would apply). An insurance policy platform (e.g., a dynamic pricing insurance policy platform) may thus track the "For Hire" and "Not For Hire" status of an insurance customer during operation of a vehicle. For example, an application implemented on a computing device used by an insurance customer (e.g., the mobile applications 155, 155A, 155B) may monitor the usage scenario (e.g., "For Hire" or "Not For Hire") of a vehicle associated with the insurance customer, and may send the usage scenario information to an insurance policy platform (e.g., the dynamic pricing insurance policy platform 101). The insurance policy platform may store the usage scenario information. For example, the dynamic pricing insurance policy platform 101 may, based on the received information, create records of when the insurance customer was "For Hire" and "Not For Hire" in the usage database 173.

It will also be appreciated that the various phases of a ride sharing service may involve different levels and types of risk that should be accounted for in a ride sharing insurance policy. As seen in FIG. 3A, for example, the phases of a ride sharing service may include: an idle phase in which the vehicle is for hire and looking for passengers but has not yet been hired, a passenger acquisition phase in which the vehicle has been hired and is traveling to pick up a passenger (or multiple passengers in the case of a ride sharing pool) but is not yet traveling to the destination, and an on route phase in which the passenger(s) have been acquired and the vehicle is traveling to the destination. The insurance policy platform may likewise track the current phase of the ride sharing service in order to determine the appropriate provisions of the ride sharing insurance policy to activate and apply to that portion of the vehicle operation. For example, an application implemented on a computing device used by an insurance customer (e.g., the mobile applications 155, 155A, 155B) may monitor the phases of a usage scenario (e.g., "Idle," "Passenger Acquisition," or "On Route" of the ride sharing usage scenario) of a vehicle associated with the insurance customer, and may send the usage scenario phase information to an insurance policy platform (e.g., the dynamic pricing insurance policy platform 101). The insurance policy platform may store the usage scenario phase information. For example, the dynamic pricing insurance policy platform 101 may, based on the received information, create records of when the insurance customer was "Idle," "Passenger Acquisition," and "On Route" in the usage database 173.

The various phases of a ride sharing service and the transitions between them are shown by way of example in FIG. 3A. For example, an insurance customer may switch among various phases of a ride sharing service, such as an idle phase, a passenger acquisition phase, and/or an on route phase. The insurance customer may be in the idle phase if the insurance customer switches to the ride sharing usage scenario and is looking for passengers. If the insurance customer gets hired for a ride sharing service, the insurance customer may be switched to the passenger acquisition phase. During the passenger acquisition phase, the insurance customer may be traveling to pick up one or more passengers. In some example (e.g., where the ride sharing service is provided to a pool of passengers), the insurance customer may be in the passenger acquisition phase until all passengers have been picked up. If the ride sharing service is canceled during the passenger acquisition phase, the insurance customer may be switched to the idle phase. If the passenger(s) have been picked up, the insurance customer may be switched to the on route phase. In the on route phase, the insurance customer may be traveling to the destinations indicated by the passenger(s). The insurance customer may stay in the on route phase until all passengers picked up have been dropped out at the indicated destination(s). If the ride sharing service has been completed (e.g., if all passengers picked up have been dropped off), the insurance customer may be switched to the idle phase.

Figure 3B:
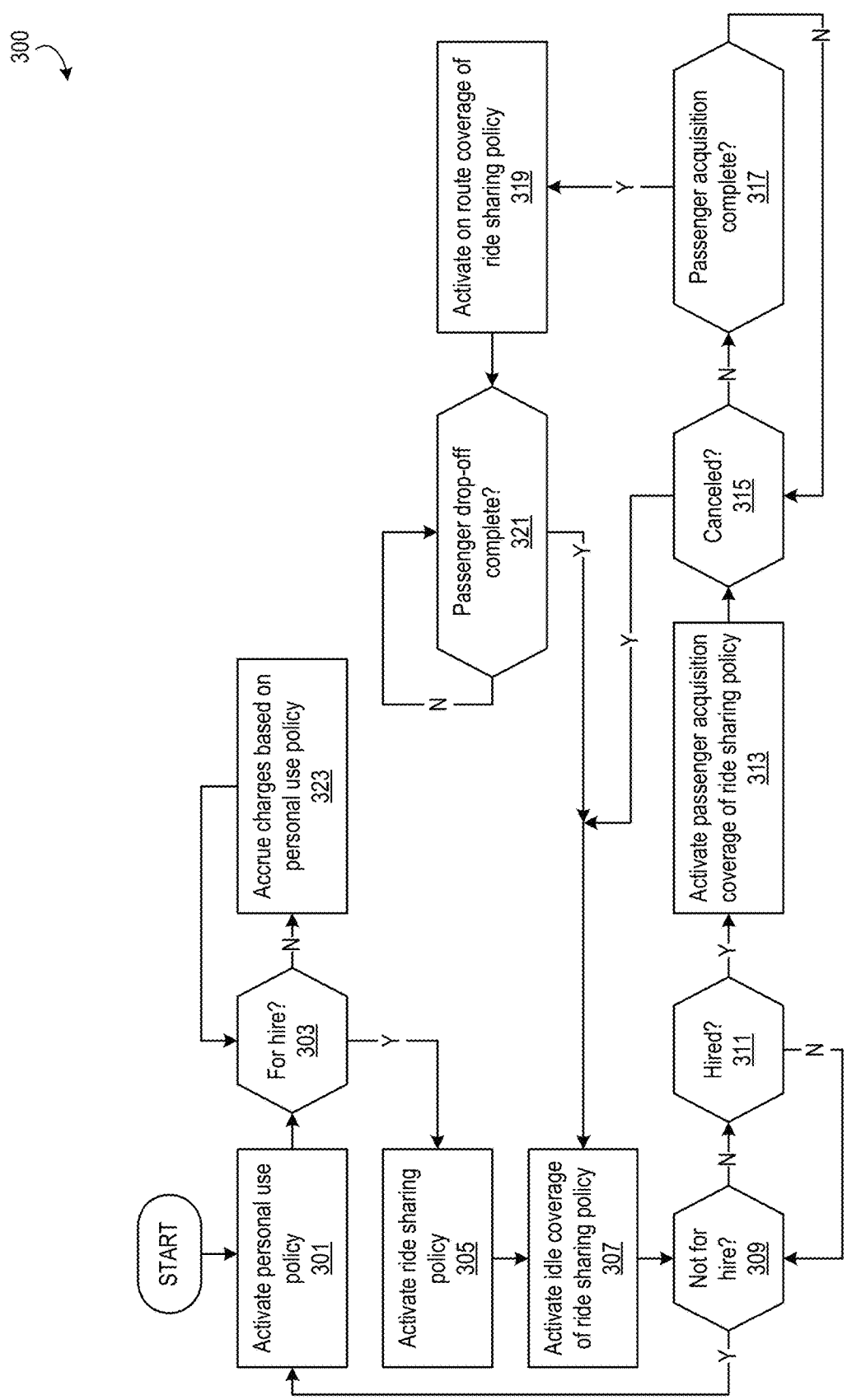
FIG. 3B provides a flowchart of example method steps for providing the personal use insurance policy provisions and the ride sharing insurance policy provisions of FIG. 3A.

FIG. 3B is a flowchart 300 of example method steps for providing the personal use insurance policy provisions and the ride sharing insurance policy provisions of FIG. 3A. The method may be performed, for example, by one or more of the systems as discussed in connection with FIGS. 1A-1B. The steps of the method may be described as being performed by particular components and/or computing devices for the sake of simplicity, but the steps may be performed by any component and/or computing device. The steps of the method may be performed by a single computing device or by multiple computing devices. One or more steps of the method may be omitted, added, and/or rearranged as desired by a person of ordinary skill in the art.

In step 301, a computing device (e.g., the dynamic pricing insurance policy platform 101, the mobile computing devices 151, 151A, 151B, the on-board computing device 165, etc.) may activate a personal use insurance policy for an insurance customer. The personal use insurance policy may be activated, for example, when a policy period of the personal use insurance policy starts. The dynamic pricing insurance policy platform 101 may create, in the usage database 173, records indicating the start time of the personal use usage scenario. Additionally or alternatively, the dynamic pricing insurance policy platform 101 may create, in the usage database 173, records indicating the end time of the personal use usage scenario (e.g., when the usage scenario is switched to the ride sharing usage scenario).

In step 303, the computing device may determine whether the usage scenario of the vehicle of the insurance customer is switched to "For Hire" (e.g., the ride sharing usage scenario). For example, the usage scenario may be switched to "For Hire" if the insurance customer begins to offer ride sharing services to passengers (e.g., using a ride sharing application). If the usage scenario is switched to "For Hire" (step 303: Y), the method may proceed to step 305. In step 305, the computing device may activate a ride sharing insurance policy for the insurance customer. The ride sharing insurance policy may, for example, specify a different RPS range than the personal use insurance policy. The dynamic pricing insurance policy platform 101 may create, in the usage database 173, records indicating the start time of the "For Hire" usage scenario. Additionally or alternatively, the dynamic pricing insurance policy platform 101 may create, in the usage database 173, records indicating the end time of the "For Hire" usage scenario (e.g., when the usage scenario is switched to personal use or the like).

In step 307, the computing device may activate an idle coverage of the ride sharing insurance policy for the insurance customer. The idle coverage of the ride sharing insurance policy may have its own RPS range. The RPS range associated with the idle coverage may be used for calculating insurance charges accrued during the idle phase. The dynamic pricing insurance policy platform 101 may create, in the usage database 173, records indicating the start time of the idle phase and/or the end time of the idle phase. In step 309, the computing device may determine whether the usage scenario of the vehicle of the insurance customer is switched to "Not For Hire" (e.g., the personal use usage scenario). For example, the usage scenario may be switched to "Not For Hire" if the insurance customer stops offering ride sharing services to passengers. If the usage scenario is switched to "Not For Hire" (step 309: Y), the method may repeat step 301. If the usage scenario is not switched to "Not For Hire" (step 309: N), the method may proceed to step 311.

In step 311, the computing device may determine whether the insurance customer is hired for providing a ride sharing service (e.g., whether the insurance customer is switched to the passenger acquisition phase). If the insurance customer is not hired for providing a ride sharing service (step 311: N), the method may repeat step 309. If the insurance customer is hired for providing a ride sharing service (step 311: Y), the method may proceed to step 313. In step 313, the computing device may activate a passenger acquisition coverage of the ride sharing insurance policy for the insurance customer. The passenger acquisition coverage of the ride sharing insurance policy may have its own RPS range. The RPS range associated with the passenger acquisition coverage may be used for calculating insurance charges accrued during the passenger acquisition phase. The dynamic pricing insurance policy platform 101 may create, in the usage database 173, records indicating the start time of the passenger acquisition phase and/or the end time of the passenger acquisition phase.

In step 315, the computing device may determine whether the ride sharing service to be provided is canceled (e.g., by the passenger(s)). If the ride sharing service to be provided is canceled (step 315: Y), the method may repeat step 307. For example, in step 307, the insurance customer may be switched to the idle phase, and the computing device may activate the idle coverage of the ride sharing insurance policy for the insurance customer. If the ride sharing service to be provided is not canceled (step 315: N), the method may proceed to step 317. In step 317, the computing device may determine whether the passenger acquisition is completed. For example, the computing device may determine that the passenger acquisition is completed if the insurance customer has picked up the passenger(s) to whom the ride sharing service is to be provided. If the passenger acquisition is not completed (step 317: N), the method may repeat step 315. If the passenger acquisition is completed (step 317: Y), the method may proceed to step 319.

In step 319, the computing device may activate an on route coverage of the ride sharing insurance policy for the insurance customer. The on route coverage of the ride sharing insurance policy may have its own RPS range. The RPS range associated with the on route coverage may be used for calculating insurance charges accrued during the on route phase. The dynamic pricing insurance policy platform 101 may create, in the usage database 173, records indicating the start time of the on route phase and/or the end time of the on route phase. In step 321, the computing device may determine whether the drop-off of the passenger(s) is completed. If the drop-off of the passenger(s) is completed (step 321: Y), the method may repeat step 307. If the drop-off the passenger(s) is not completed (step 321: N), the method may repeat step 321.

If the usage scenario is not switched to "For Hire" (step 303: N), the method may proceed to step 323. In step 323, the computing device may determine, based on the personal use insurance policy, insurance charges accrued during the personal use usage scenario. For example, the computing device may calculate the accrued charges based on an RPS range specified by the personal use insurance policy for the insurance customer, for example, according to the processes as discussed in connection with FIGS. 2A-2C.

Figure 4A:
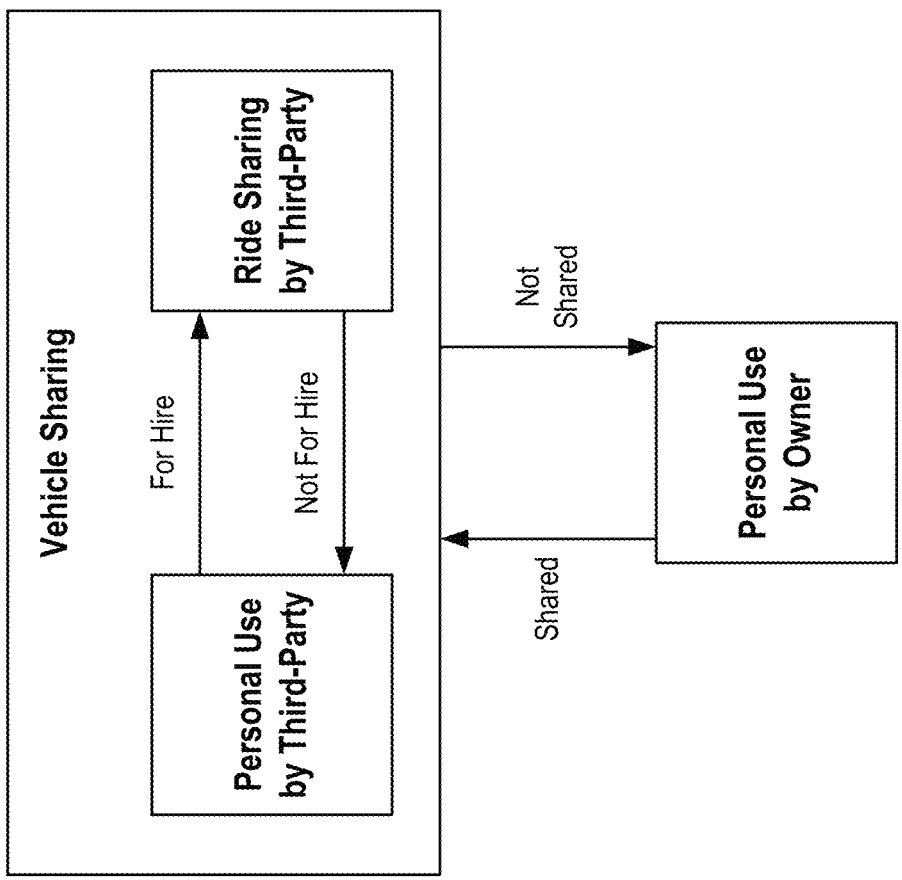
FIG. 4A provides a diagram of an example relationship between personal use insurance policy provisions and vehicle sharing insurance policy provisions.

The features of a dynamic pricing insurance policy such as those described above may also be applicable to vehicle sharing contexts. For example, an insurance customer may own a vehicle for personal use but also offer that vehicle for use by others ("vehicle sharing"). Another individual may use that vehicle for personal use and/or for ride sharing purposes (a combination of vehicle sharing and ride sharing). Accordingly, the vehicle owner's personal insurance policy provisions may apply when the vehicle owner operates the vehicle for personal use, and the vehicle owner's ride sharing insurance policy provisions may apply when operating the vehicle for ride sharing purposes. When operated by another individual in a vehicle sharing situation, the vehicle operator's own insurance policy provisions may apply. The vehicle operator's own personal insurance policy provisions or ride sharing insurance policy provisions may apply depending on whether the vehicle is for personal or ride sharing use. A similar challenge arising from these situations (vehicle owner versus operator use and personal use versus ride sharing) is determining which individual's insurance policy should apply (owner versus operator) and what insurance coverage applies at any given data and time. As shown in FIG. 4A and discussed below, the use of a vehicle may alternate between the vehicle owner and another individual (in vehicle sharing situations) and between personal use and use for ride sharing services. Again, whether an insurer can charge the appropriate individual for the particular risk exposure arising from those different uses depends on having accurate records of who is using the vehicle and for what purpose.

FIG. 4A is a diagram of an example relationship between personal use insurance policy provisions and ride sharing insurance policy provisions. As shown in FIG. 4A, the use of a vehicle may switch between personal use by the vehicle owner and vehicle sharing by a third party (e.g., a vehicle operator). If the vehicle is not shared by a third party, the vehicle may be used by the vehicle owner (e.g., for personal use, for ride sharing, and/or for other purposes). If the vehicle is shared by a third party, the vehicle may be used by the third party (e.g., for personal use, for ride sharing, and/or for other purposes). If the vehicle is used by a third party, the third party may be, for example, switched between personal use by the third party and ride sharing by the third party. The third party may be in his or her ride sharing usage scenario, for example, if the third party's use of the vehicle is "For Hire" (e.g., if the third party starts to offer ride sharing services to passengers). The third party may be in his or her personal use usage scenario, for example, if the third party's use of the vehicle is "Not For Hire" (e.g., if the third party stops offering ride sharing services to passengers). An insurance policy platform (e.g., the dynamic pricing insurance policy platform 101) may track the usage of a vehicle, and may store the information (e.g., in the usage database 173).

Figure 4B:
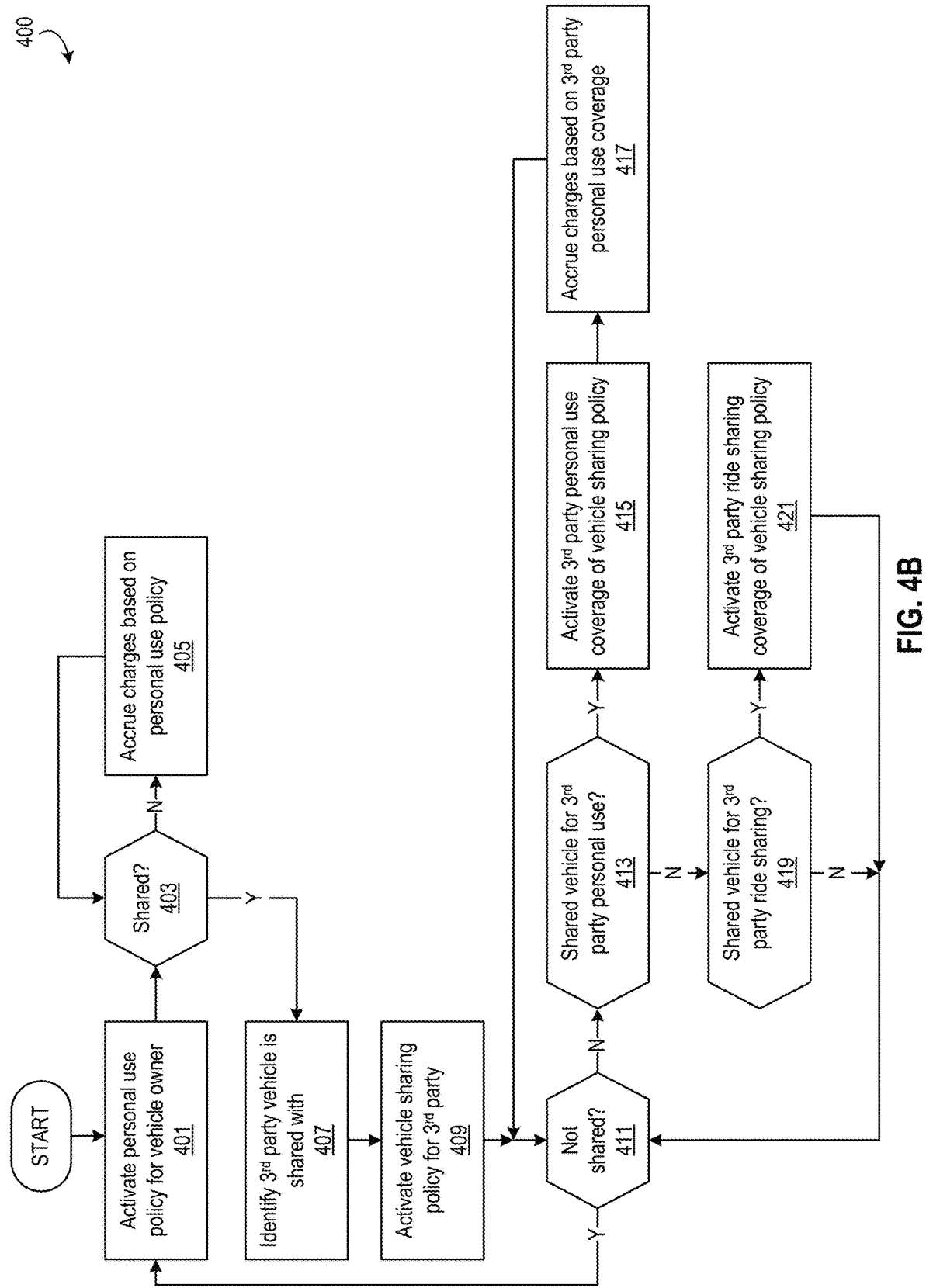
FIG. 4B provides a flowchart of example method steps for providing the personal use insurance policy provisions and the vehicle sharing insurance policy provisions of FIG. 4A.

FIG. 4B is a flowchart 400 of example method steps for providing the personal use insurance policy provisions and the vehicle sharing insurance policy provisions of FIG. 4A. The method may be performed, for example, by one or more of the systems as discussed in connection with FIGS. 1A-1B. The steps of the method may be described as being performed by particular components and/or computing devices for the sake of simplicity, but the steps may be performed by any component and/or computing device. The steps of the method may be performed by a single computing device or by multiple computing devices. One or more steps of the method may be omitted, added, and/or rearranged as desired by a person of ordinary skill in the art.

In step 401, a computing device (e.g., the dynamic pricing insurance policy platform 101, the mobile computing devices 151, 151A, 151B, the on-board computing device 165, etc.) may activate a personal use insurance policy for an owner of a vehicle. As an example, a mobile computing device of the vehicle owner may determine that the vehicle is used by the vehicle owner, and may inform the dynamic pricing insurance policy platform 101 that the vehicle is used by the vehicle owner. The dynamic pricing insurance policy platform 101 may determine an insurance policy for the vehicle owner, for example, based on the information stored in the policy database 171. The insurance policy for the vehicle owner may, for example, correspond to a personal use usage scenario or a ride sharing usage scenario. The dynamic pricing insurance policy platform 101 may create, in the usage database 173, records indicating the start time of the use of the vehicle by the vehicle owner and/or the end time of the use of the vehicle by the vehicle owner.

In step 403, the computing device may determine whether the vehicle is shared with a third party (e.g., if the vehicle is used by the third party). As an example, the third party may obtain access to the vehicle using a vehicle sharing application, and the vehicle sharing application may indicate, to the dynamic pricing insurance policy platform 101, that the vehicle is currently used by the third party. If the vehicle is not shared with a third party (step 403: N), the method may proceed to step 405. In step 405, the computing device may determine, based on the insurance policy for the vehicle owner, insurance charges accrued during the use of the vehicle by the vehicle owner. For example, the computing device may calculate the accrued charges based on an RPS range specified by the insurance policy for the vehicle owner, for example, according to the processes as discussed in connection with FIGS. 2A-2C.

If the vehicle is shared with a third party (step 403: Y), the method may proceed to step 407. In step 407, the computing device may identify the third party with which the vehicle is shared. For example, the vehicle sharing application may indicate, to the dynamic pricing insurance policy platform 101, the identity of the third party. Based on the identity of the third party, the computing device may determine the insurance policy(s) for the third party. For example, the policy database 171 may store records corresponding to the third party, where the records may indicate the insurance policy(s) for the third party. In step 409, the computing device may activate a vehicle sharing insurance policy for the third party.

In step 411, the computing device may determine whether the use of the vehicle is switched to "Not Shared" (e.g., whether the vehicle is used by the vehicle owner). If the use of the vehicle is switched to "Not Shared" (step 411: Y), the method may repeat step 401. If the use of the vehicle is not switched to "Not Shared" (step 411: N), the method may proceed to step 413. In step 413, the computing device may determine whether the vehicle is used by the third party for personal use. The determination may be based on, for example, information from a ride sharing application used by the third party. For example, if the third party starts to offer ride sharing services to passengers (e.g., via the ride sharing application), the ride sharing application may indicate, to the dynamic pricing insurance policy platform 101, that the vehicle is used by the third party for ride sharing. If the vehicle is used by the third party for personal use (step 413: Y), the method may proceed to step 415.

In step 415, the computing device may activate a personal use coverage of the vehicle sharing insurance policy for the third party. The personal use coverage of the vehicle sharing insurance policy for the third party may have its own RPS range. The RPS range associated with the personal use coverage may be used for calculating insurance charges accrued during the personal use of the vehicle by the third party. In step 417, the computing device may determine, based on the personal use coverage of the vehicle sharing insurance policy for the third party, insurance charges accrued during the personal use of the vehicle by the third party. For example, the computing device may calculate the accrued charges based on an RPS range specified by the personal use coverage of the vehicle sharing insurance policy for the third party, for example, according to the processes as discussed in connection with FIGS. 2A-2C. Following step 417, the method may repeat step 411.

If the vehicle is not used by the third party for personal use (step 413: N), the method may proceed to step 419. In step 419, the computing device may determine whether the vehicle is used by the third party for ride sharing. If the vehicle is not used by the third party for ride sharing (step 419: N), the method may repeat step 411. If the vehicle is used by the third party for ride sharing (step 419: Y), the method may proceed to step 421. In step 421, the computing device may activate a ride sharing coverage of the vehicle sharing insurance policy for the third party. The ride sharing coverage of the vehicle sharing insurance policy for the third party may have its own RPS range. The RPS range associated with the ride sharing coverage may be used for calculating insurance charges accrued during the ride sharing usage of the vehicle by the third party. Additionally or alternatively, the computing device may determine, based on the ride sharing coverage of the vehicle sharing insurance policy for the third party, insurance charges accrued during the ride sharing usage of the vehicle by the third party. For example, the computing device may calculate the accrued charges based on an RPS range specified by the ride sharing coverage of the vehicle sharing insurance policy for the third party, for example, according to the processes as discussed in connection with FIGS. 2A-2C. Following step 421, the method may repeat step 411.

Figure 5A:
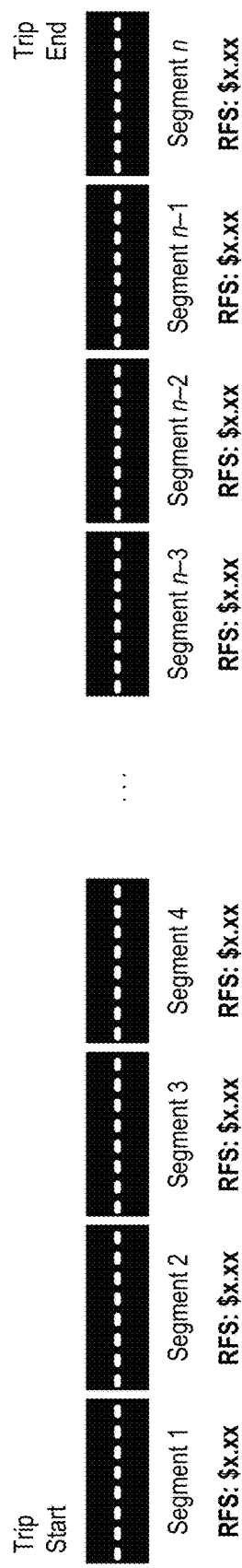
FIG. 5A provides a diagram of a dynamic pricing insurance policy employing individual rates for segments traveled in accordance with some aspects of the present disclosure.

FIG. 5A provides a diagram of a dynamic pricing insurance policy that employs individual rates for each segment traveled during a trip. The segments may be defined as one mile, one half-mile, one-tenth of a mile, and the like. The dynamic pricing insurance policy, in this example, includes a "rate for segment" (RFS) range (e.g., $0.02-0.20). Each segment of the trip thus receives its own rate based on the RFS range (e.g., $0.10).

Similar to the dynamic pricing insurance policy discussed above with reference to FIGS. 2A-C, the RFS for a particular segment of the trip may be based on the driving behaviors observed during one or more segments of the trip. For example, the RFS for a particular segment may be based on the driving behaviors observed during one or more segments of the trip. The RFS may be determined based solely on the driving behaviors observed during the current (or most recently completed) segment. The RFS for a particular segment may also be based on the driving behaviors observed during one or more previously completed segments of the trip (e.g., two or three previously completed segments). The RFS may be applied retroactively, e.g., applied to a segment after that segment has been completed and based on the driving behaviors observed during that segment (or multiple previously completed segments). The RFS may also be applied proactively, e.g., applied to an upcoming segment and based on the driving behaviors observed during one or more completed segments (e.g., the most recently completed n segments, where n≥1). In some implementations, the vehicle operator may receive feedback in real-time about the RFS rates applied to the segments of the trip. Such feedback may be provided, e.g., by the mobile app of the vehicle operator's mobile device, or another type of in-vehicle display device. In this way, the vehicle operator may modify their driving behaviors to achieve better RFS rates for the remainder of the trip. Accordingly, the respective RFS rates for the segments of the trip may be determined in real-time during the trip (e.g., as each new segment is completed) or once the trip is complete.

Figure 5B:
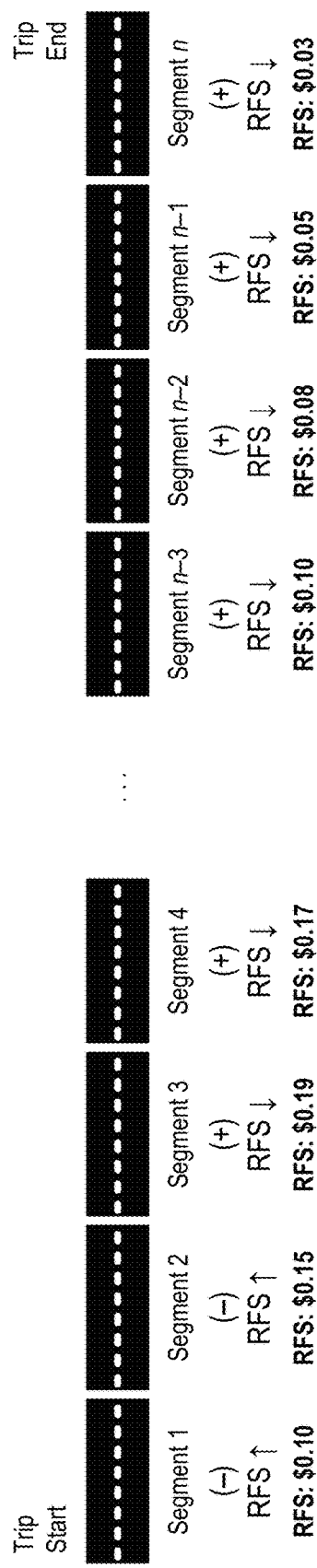
FIG. 5B provides an example of an implementation of the dynamic pricing insurance policy described with reference to FIG. 5A.

FIG. 5B provides a diagram of an example of an implementation of the dynamic pricing insurance policy described with reference to FIG. 5A. In the example dynamic pricing insurance policy of FIG. 5B, the RFS range is $0.02-0.20. A first segment of a trip may receive a default RFS. The default RFS may, for example, correspond to the median of the RFS range (e.g., $0.10). The RFS for segments of the trip may be determined, for example, based on driving behaviors observed during their preceding segments. For example, the first segment may receive a negative evaluation with respect to driving behaviors observed during the first segment, and accordingly the RFS for a second segment following the first segment may be increased from the RFS for the first segment. For example, the RFS for the second segment may correspond to $0.15 (e.g., increased from $0.10). The second segment may receive a negative evaluation with respect to driving behaviors observed during the second segment, and accordingly the RFS for a third segment following the second segment may be increased from the RFS for the second segment. For example, the RFS for the third segment may correspond to $0.19 (e.g., increased from $0.15). The third segment may receive a positive evaluation with respect to driving behaviors observed during the third segment, and accordingly the RFS for a fourth segment following the third segment may be decreased from the RFS for the third segment. For example, the RFS for the fourth segment may correspond to $0.17 (e.g., decreased from $0.19). The RFSs for the subsequent segments of the trip may be similarly determined. The RFS for a particular segment of a trip may be determined retroactively. For example, the RFS for a particular segment of a trip may be determined based on driving behaviors observed during that particular segment after that particular segment has been completed. Additionally or alternatively, the RFS for a particular segment of a trip may be determined proactively (e.g., for a next segment). For example, the RFS for a particular segment of a trip may be determined based on driving behaviors observed during a segment preceding that particular segment.

Figure 5C:
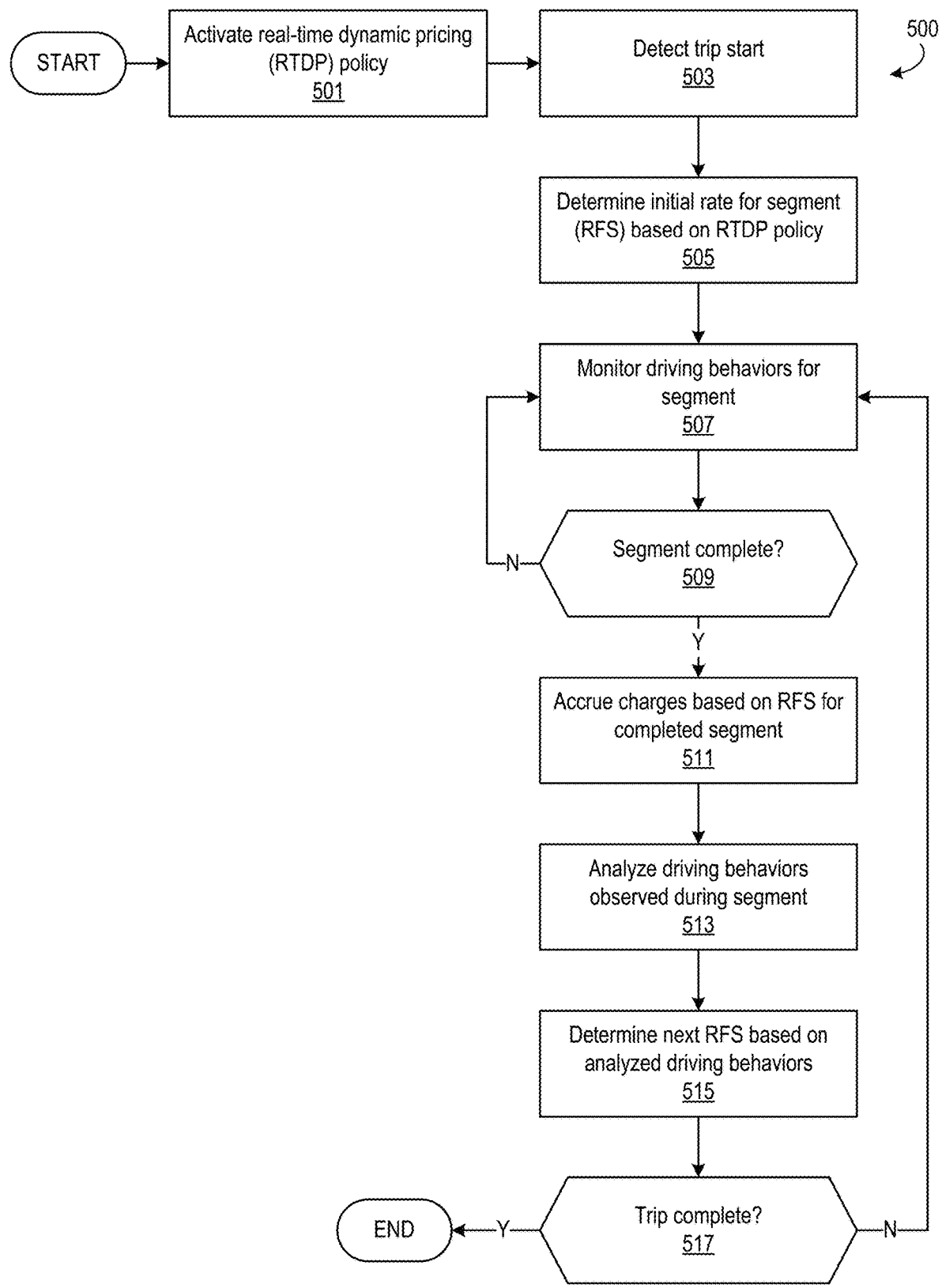
FIG. 5C provides a flowchart of example method steps for providing a real-time dynamic pricing insurance policy in accordance with some aspects of the present disclosure.

FIG. 5C is a flowchart of example method steps for providing a dynamic pricing insurance policy such as that described above with reference to FIGS. 5A-B. The method may be performed, for example, by one or more of the systems as discussed in connection with FIGS. 1A-1B. The steps of the method may be described as being performed by particular components and/or computing devices for the sake of simplicity, but the steps may be performed by any component and/or computing device. The steps of the method may be performed by a single computing device or by multiple computing devices. One or more steps of the method may be omitted, added, and/or rearranged as desired by a person of ordinary skill in the art.

In step 501, a computing device (e.g., the dynamic pricing insurance policy platform 101) may activate a real-time dynamic pricing (RTDP) insurance policy (e.g., for an insurance customer). For example, the RTDP insurance policy may be activated when its policy period starts. In step 503, the computing device may detect a start of a trip (e.g., associated with the insurance customer). As an example, the insurance customer may indicate, to a mobile application implemented on a mobile computing device of the insurance customer, that the insurance customer is about to start to use his or her vehicle, and the mobile application may send that information to the dynamic pricing insurance policy platform 101. Additionally or alternatively, the mobile application may detect that a trip has started based on movement of the mobile device, e.g., based on GPS information indicating the geographic location(s) of the vehicle, based on data from one or more accelerometers indicating movement at or above a threshold acceleration or velocity, and the like.

In step 505, the computing device may determine an initial RFS based on the RTDP insurance policy for the insurance customer. For example, the policy database 171 of the dynamic pricing insurance policy platform 101 may store information related to the RTDP insurance policy for the insurance customer. The computing device may query the policy database 171, and may determine an RFS range (e.g., as indicated by the RTDP insurance policy) for the insurance customer. The initial RFS may correspond to, for example, the median of the RFS range. In step 507, the computing device may monitor driving behaviors for a first segment of the trip. For example, a mobile application of the insurance customer may be configured to detect driving behaviors using sensors (e.g., accelerometers mobile computing device, etc.). The mobile application may send the detected driving behaviors to the computing device. The computing device may, for example, create records, in the evaluation database 175, indicating the observed driving behaviors associated with the insurance customer.

In step 509, the computing device may determine whether the first segment of the trip has been completed. If the first segment of the trip has not been completed (step 509: N), the method may repeat step 507. If the first segment of the trip has been completed (step 509: Y), the method may proceed to step 511. In step 511, the computing device may accrue insurance charges for the insurance customer based on the RFS for the completed segment. For example, the computing device may store the information related to the accrued charges in the pricing database 177.

In step 513, the computing device may analyze the driving behaviors observed during the completed segment. The computing device may assign a positive evaluation or a negative evaluation to the completed segment. For example, the computing device may assign a positive evaluation to the completed segment if the driving behaviors observed during the completed segment comprise a predetermined number of "bad" driving behavior instances (e.g., fast acceleration, hard braking, sharp turning, etc.). In step 515, the computing device may determine, based on the driving behavior analysis, a RFS for a next segment following the first segment of the trip. For example, the computing device may increase the RFS for the first segment if the first segment receives a negative evaluation, and may decrease the RFS for the first segment if the first segment receives a positive evaluation. The computing device may set the RFS for the next segment to the increased or decreased RFS.

In step 517, the computing device may determine whether the trip of the insurance customer has been completed. For example, a mobile application of the insurance customer may indicate, to the computing device, that the trip has been completed. Additionally or alternatively, the mobile application may again automatically determine that a trip has been completed based on, e.g., GPS information or data from one or more accelerometers. If the trip of the insurance customer has been completed (step 517: Y), the method may end. If the trip of the insurance customer has not been completed (step 517: N), the method may repeat step 507.

Additional and alternative types of dynamic pricing insurance policy provisions will be appreciated with the benefit of the disclosures above. For example, a dynamic pricing insurance policy may combine the features of RPS and RFS policy provisions. In this example, a segment (observation period or trip segment) may receive both an RFS range and a determined RFS. The RFS range determined for a particular segment may be based on an RPS range specified by the dynamic pricing insurance policy and observed driving behaviors. For example, a dynamic pricing insurance policy may specify an RPS range (e.g., $0.02-0.20) from which individual RFS ranges (e.g., $0.02-0.05, $0.10-0.13, etc.) are determined for the individual segments (e.g., observation period or trip segment). The RFS range for a particular segment may be based on an evaluation of the driving behaviors observed during one or more previously completed segments (e.g., previously complete observation periods or previously completed trip segments). An RFS for that segment may then be determined based on the driving behaviors observed during that particular segment. In one concrete example, a dynamic pricing insurance policy may specify an RPS range of $0.02-0.20. Based on "good" driving behaviors observed during one or more previously completed observation periods, an RFS range of ($0.02-0.05) may be determined for the next, upcoming observation period. Upon completion of that next observation period, the driving behaviors observed may be evaluated and used to determine an RFS for the observation period based on the determined RFS range ($0.02-0.05). If the driver exhibited "good" driving behaviors during the observation period, then the determined RFS may be on the lower end of the determined RFS range (e.g., $0.02). If the driver exhibited "bad" driving behaviors during the observation period, then the determined RFS may be on the higher end of the determined RFS range (e.g., $0.05). In a similar fashion, each segment of a trip may receive an individual RFS range based on an RFS range specified by a dynamic pricing insurance policy, and the RFS for a particular trip segment may be based on the RFS range determined for that trip segment and an evaluation of the driving behaviors observed during that trip segment.

The dynamic pricing insurance policy provisions described herein may apply to the personal use, ride sharing, and vehicle sharing contexts described above. For example, a dynamic pricing insurance policy may apply RPS provisions and/or RFS provisions during a vehicle owner's personal use of the vehicle or when using the vehicle for ride sharing purposes. Similarly, a dynamic pricing insurance policy may apply RPS provisions and/or RFS provisions when a third-party operates a vehicle in a vehicle sharing context for personal use or ride sharing purposes.

Additional factors may be used to determine a rate for the insurance policy (e.g., RFS, RFS range, RPS, or RPS range). For example, the dynamic pricing insurance policy platform may track the number of segments (e.g., mile, half-mile, tenth of a mile, etc.) traveled on urban, suburban, rural roads, and the like. The dynamic pricing insurance policy platform may additionally or alternatively track the number of segments traveled on highways, interstates, surface streets, and the like. The dynamic pricing insurance policy platform may thus determine the rate based on the number, percentage, or ratio of one or more segment types (e.g., the total number of urban miles driver, the percentage of suburban miles driven relative to all miles driven, the ratio of highway miles driven versus surface street miles driven, etc.) Additional and alternative types of segments may be employed. The dynamic pricing insurance policy platform may determine the type of segments traveled based on location information received, e.g., from a GPS located in the vehicle (e.g., installed in the vehicle itself or in a mobile computing device traveling in the vehicle).

A customer may also be able to "lock in" a particular rate (e.g., RFS, RFS range, RPS, or RPS range) for an insurance policy. If a customer, through "good" driving behaviors, achieves a desirable rate, that customer may be provided the option to purchase some number of segments (e.g., miles, half-miles, tenths of a mile, etc.) charged at that "locked in" rate. The dynamic pricing insurance policy platform may thus charge the customer at the "locked in" rate for the number of segments purchased. The dynamic pricing insurance policy platform may thus track the segments traveled while the "locked in" rate is in effect and determine if/when the customer depletes the number of purchased segments.

The disclosures described above may also be applied and implemented in the context of autonomous ("self-driving") vehicles. Such vehicles may include fully-autonomous vehicles as well as vehicles that can switch between manual and autonomous driving modes. In this regard, a dynamic pricing insurance policy platform (e.g., dynamic pricing insurance policy platform 101 of FIG. 1A) may track whether a vehicle is an autonomous or non-autonomous vehicle. Likewise, a dynamic pricing insurance policy platform may track when a vehicle operates in manual versus autonomous driving modes.

To track and log the driving modes, a dynamic pricing insurance policy platform may be in signal communication with a vehicle as described above with reference to FIG. 1B in order to track and log the driving mode (e.g., manual versus autonomous) of a vehicle during a trip. For example, a dynamic pricing insurance policy platform may receive one or more messages indicating that a vehicle has switched from a manual operation mode to an autonomous operation mode or from an autonomous operation mode to a manual operation mode. Such messages may, for example, include the date and time the vehicle switched from one mode to another. Such messages may also indicate whether the vehicle switched between modes at the request of the driver or at the initiation of the vehicle itself, for example, in response to an event encountered during the trip (e.g., switching to an autonomous braking mode and/or an autonomous steering mode to automatically slow down and/or swerve the vehicle in response to detecting a potential collision). Such messages may also indicated the extent of autonomy the autonomous driving mode provides.

The level of autonomy in an autonomous vehicle may vary. For example, autonomy may range from assisting the driver with certain aspects of vehicle operation (e.g., speed, steering, braking) in some circumstances to full autonomy in which the vehicle can travel without driver assistance or oversight in any expected driving condition. Intermediate levels of autonomy may include partial automation in which the vehicle assists the driver by controlling some aspects of its operation (e.g., speed, steering, braking) in some circumstances, or in which the vehicle controls such aspects under normal driving conditions with oversight from the driver, or in which the vehicle can travel without driver oversight under normal driving conditions. Additional and alternative levels of automation will be appreciated. A dynamic pricing insurance policy platform may track the extent of automation using any suitable identifiers (e.g., "Level 1"/"Level 2"/etc., "Full"/"Partial"/etc., and the like). A dynamic pricing insurance policy platform may track and log the operation modes (e.g., manual versus autonomous) in one or more records of a usage database (e.g., usage database 173 of FIG. 1B). For example, a usage database may store the following records: [customer-1, 01.01.2000, 3:30-4:00, manual, driver] and [customer-1, 01.01.2000, 4:00-4:05, autonomous, full, vehicle]. The former record may indicate that customer-1 operated the vehicle in a manual operation mode from 3:30-4:00 on 01.01.2000 and that such manual operation was initiated by the driver. The latter record may indicate that customer-1 operated the vehicle in a fully autonomous operation mode from 4:00-4:05 on 01.01.2000 and that such autonomous operation was initiated by the vehicle itself (e.g., after detecting that the driver fell asleep during the trip).

A dynamic pricing insurance policy platform may receive messages related to manual versus autonomous operation from the vehicle. This may include receiving such messages directly from the vehicle itself from an on-board computing device (e.g., on-board computing device 165 of FIG. 1B) or from a mobile app of a mobile computing device (e.g., mobile app 155A/155B and mobile computing device 151A/151B in FIG. 1B). Accordingly, a mobile app may be in signal communication with an on-board computing device of a vehicle in order to detect when the vehicle switches between manual and autonomous operation modes.

The information that a dynamic pricing insurance policy platform receives characterizing driving behaviors may also indicate whether a driving behavior is a manual driving behavior manually performed by the driver or an autonomous driving behavior autonomously performed by the vehicle. In turn, a dynamic pricing insurance policy platform may determine appropriate insurance rates based on whether observed driving behaviors are manual or autonomous driving behaviors. Selecting to operate a vehicle in an autonomous operation mode, for example, may be one factor that contributes to relatively lower insurance rates. Additionally or alternatively, autonomous operation that intervenes with manual operation of a vehicle (e.g., to avoid a collision or reduce excessive speed) may be a factor that contributes to relatively higher insurance rates. Moreover, the policy database of a dynamic pricing insurance policy platform (e.g., policy database 171 in FIG. 1B) may store insurance policies that provides different types of coverage depending on whether a vehicle operates in a manual or autonomous operation mode. Accordingly, an insurance policy may specify one dynamic pricing range (e.g., $0.02-0.20 per segment) for operation of the vehicle in a manual operation mode and another dynamic pricing range (e.g., $0.01-0.10 per segment) for operation of the vehicle in an autonomous operation mode. Other dynamic pricing ranges may be provided for various combinations of usage scenarios including, for example, a personal-manual policy, a person-autonomous policy, a ride sharing-manual policy, a ride sharing-autonomous policy, a vehicle sharing-manual policy, a vehicle sharing autonomous policy, and the like.

Aspects of the disclosure have been described in terms of example embodiments thereof. Numerous other embodiments, modifications, and variations will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Additionally, those skilled in the art will appreciate that there are numerous variations and permutations of the above-described systems and techniques that fall within the spirit and scope of the subject matter as set forth in the appended claims.

What is claimed is:

1. A system comprising:
   one or more processors; and
   memory storing instructions that, when executed by the one or more processors, cause the system to:
   receive vehicle operation data characterizing operation of a vehicle during a first period, wherein the first period has a first duration and comprises a plurality of second periods each having a second duration shorter than the first duration, wherein the vehicle operation data comprises, for each second period of the plurality of second periods, an indication of a quantity of driving segments traveled during the second period;
   determine, for each second period of the plurality of second periods and based on the quantity of driving segments traveled during the second period by a driver, an amount to charge the driver;
   determine, based on the amount determined for each second period of the plurality of second periods, a total amount to charge the driver for insurance coverage provided during the first period; and
   send, to at least the driver, an indication of the total amount determined.

2. The system of claim 1, wherein the amount to charge the driver is determined based on a first indication of a first driving behavior that occurred during the second period and a second indication of a second driving behavior that occurred during the second period.

3. The system of claim 1, wherein the system receives the vehicle operation data via a wireless communication channel from a vehicle telematics device associated with the vehicle and configured to detect, using one or more sensors, operation of the vehicle.

4. The system of claim 1, wherein the instructions, when executed by the one or more processors, cause the system to select an insurance rate for a second period of the plurality of second periods further based on a prior insurance rate selected for a prior second period, and wherein the amount to charge the driver is determined further based on the insurance rate.

5. The system of claim 1, wherein the instructions, when executed by the one or more processors, further cause the system to select an insurance rate based on a type of a driving behavior of the driver, wherein the amount to charge the driver is determined further based on the insurance rate.

6. The system of claim 1, wherein the instructions, when executed by the one or more processors, further cause the system to select an insurance rate, based on a type of a driving behavior of the driver, that is greater than a prior insurance rate selected for a prior second period, wherein the amount to charge the driver is determined further based on the insurance rate.

7. The system of claim 1, wherein the instructions, when executed by the one or more processors, further cause the system to:
   receive, for a second period of the plurality of second periods, an indication of a ride sharing status of the vehicle; and
   select an insurance rate for the second period based on the ride sharing status received, wherein the amount to charge the driver is determined further based on the insurance rate.

8. The system of claim 1, wherein the instructions, when executed by the one or more processors, further cause the system to:
   receive, for a second period of the plurality of second periods, an indication of a ride sharing phase of the vehicle; and
   select an insurance rate for the second period based on the ride sharing phase received, wherein the amount to charge the driver is determined further based on the insurance rate.

9. The system of claim 1, wherein the instructions, when executed by the one or more processors, further cause the system to:
   receive, for a second period of the plurality of second periods, an indication of a vehicle sharing status of the vehicle; and
   select an insurance rate for the second period based on the vehicle sharing status received, wherein the amount to charge the driver is determined further based on the insurance rate.

10. The system of claim 1, wherein the instructions, when executed by the one or more processors, further cause the system to:
    receive, for a second period of the plurality of second periods, an indication of an autonomous operation status of the vehicle; and
    select an insurance rate for the second period further based on the autonomous operation status received, wherein the amount to charge the driver is determined further based on the insurance rate.

11. The system of claim 1, further comprising a data store, wherein:
    the data store stores:
      a first predetermined range of insurance rates to insure a driver for a first type of vehicle use; and
      a second predetermined range of insurance rates to insure the driver for a second type of vehicle use; and
    the instructions, when executed by the one or more processors, cause the system to:
      receive an indication of a type of vehicle use of the vehicle; and select, as a range of insurance rates, the first predetermined range of insurance rates based on the type of vehicle use being the first type of vehicle use or the second predetermined range of insurance rates based on the type of vehicle use being the second type of vehicle use, wherein the amount to charge the driver is determined further based on an insurance rate that is within the range of insurance rates.

12. A computer-implemented method comprising:
storing, at a data store of a server system, an insurance policy, wherein the insurance policy indicates a predetermined range of insurance rates to insure a driver for a driving segment traveled during a first period having a first duration, wherein the first period comprises a plurality of second periods each having a second duration shorter than the first duration;
receiving vehicle operation data characterizing operation of a vehicle during the first period, wherein the vehicle operation data comprises, for each second period of the plurality of second periods, an indication of one or more driving behaviors occurring during the second period;
selecting, from the predetermined range of insurance rates for each second period of the plurality of second periods and based on the indication of the one or more driving behaviors occurring during the second period, an insurance rate;
determining, for each second period of the plurality of second periods and based on the insurance rate selected, an amount to charge the driver;
determining, based on the amount determined for each second period of the plurality of second periods, a total amount to charge the driver for insurance coverage provided during the first period; and
sending, to at least the driver, an indication of the total amount determined.

13. The computer-implemented method of claim 12, wherein the selecting the insurance rate for the second period of the plurality of second periods comprises selecting the insurance rate further based on a prior insurance rate selected for a prior second period.

14. The computer-implemented method of claim 12, wherein the selecting the insurance rate for the second period of the plurality of second periods comprises selecting the insurance rate further based on a type of the driving behavior.

15. The computer-implemented method of claim 12, further comprising:
receiving for the second period of the plurality of second periods, an indication of a ride sharing status of the vehicle, wherein the selecting the insurance rate for the second period comprises selecting the insurance rate for the second period further based on the ride sharing status received.

16. The computer-implemented method of claim 12, further comprising:
receiving, for the second period of the plurality of second periods, an indication of a vehicle sharing status of the vehicle, wherein the selecting the insurance rate for the second period comprises selecting the insurance rate for the second period further based on the vehicle sharing status received.

17. The computer-implemented method of claim 12, further comprising:
receiving an indication of an autonomous operation status of the vehicle, and wherein the selecting the insurance rate for the second period comprises selecting the insurance rate for the second period further based on the autonomous operation status received.

18. The system of claim 1, further comprising a data store storing an insurance policy, wherein the insurance policy indicates a predetermined range of insurance rates to insure a driver for a driving segment traveled during a first period having a first duration, wherein the first period comprises a plurality of second periods each having a second duration shorter than the first duration, wherein:
the vehicle operation data further comprises an indication of one or more driving behaviors occurring during the second period; and
the instructions further cause the system to select, from the predetermined range of insurance rates for each second period of the plurality of second periods and based on the indication of the one or more driving behaviors occurring during the second period, an insurance rate, wherein the amount to charge to driver is further determined based on the insurance rate.

19. The computer-implemented method of claim 12, wherein the vehicle operation data further comprise, for each second period of the plurality of second periods, an indication of a quantity of driving segments traveled during the second period, and wherein the amount to charge the driver is further determined based on the quantity of driving segments traveled during the second period.

20. A non-transitory computer-readable medium having instructions, which when executed by one or more processors, the one or more processors to:
receive vehicle operation data characterizing operation of a vehicle during a first period, wherein the first period comprises a plurality of second periods each having a second duration shorter than the first duration, wherein the vehicle operation data comprises, for each second period of the plurality of second periods, an indication of a quantity of driving segments traveled during the second period;
determine, for each second period of the plurality of second periods and based on the quantity of driving segments traveled during the second period by a driver, an amount to charge the driver;
determine, based on the amount determined for each second period of the plurality of second periods, a total amount to charge the driver; and
send, to at least the driver, an indication of the total amount determined.

* * * * *